United States Patent [19]
Huang

[11] Patent Number: 5,859,904
[45] Date of Patent: Jan. 12, 1999

[54] METHODS AND SYSTEMS FOR CONNECTING MULTIPLE TELEPHONE LINES BETWEEN TWO STATIONS

[75] Inventor: Tapeng Huang, San Jose, Calif.

[73] Assignee: Advis, Inc., Fremont, Calif.

[21] Appl. No.: 778,527

[22] Filed: Jan. 3, 1997

Related U.S. Application Data

[60] Provisional application No. 60/028,414 Oct. 15, 1996.

[51] Int. Cl.⁶ .............................. H04M 7/00; H04M 1/57; H04M 3/42; H04N 7/14
[52] U.S. Cl. ......................... 379/219; 348/17; 358/435; 370/536; 375/260; 379/100.06; 379/100.12; 379/142; 379/201; 379/257
[58] Field of Search .................................... 358/400, 435; 375/257, 260; 370/536; 379/100.06, 100.12, 142, 201, 207, 219, 257; 348/13, 14, 16, 17

[56] References Cited

U.S. PATENT DOCUMENTS 5,442,457  8/1995  Najafi .................................. 375/260 X

*Primary Examiner*—Harry S. Hong
*Attorney, Agent, or Firm*—H. C. Chan

[57] ABSTRACT

A method for connecting a local and a remote device using a plurality of telephone lines is disclosed. The remote device calls the local device on one of the telephone lines to establish a first telephone connection. The local device sends the other telephone numbers to the remote device on the first telephone connection. The remote device can then establish additional telephone connections. Once connections are established, the two devices can divide a data stream into smaller components. These components are sent via these telephone connections. These components are received by the receiving devices and combined to recover the original data stream. One of the application of the present invention is videophone.

13 Claims, 17 Drawing Sheets

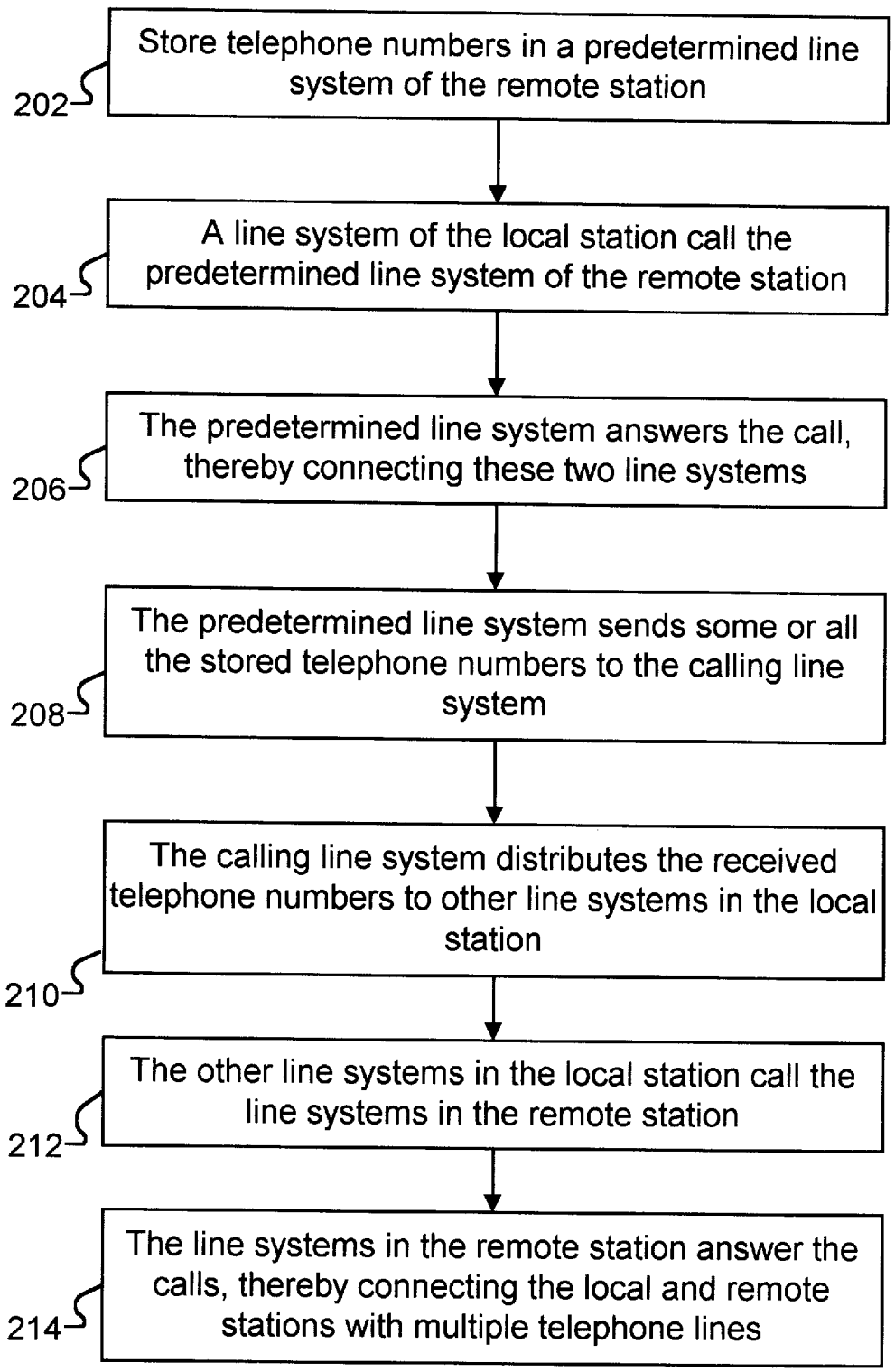
Fig. 3      200

METHODS AND SYSTEMS FOR CONNECTING MULTIPLE TELEPHONE LINES BETWEEN TWO STATIONS

CROSS-REFERENCE TO RELATED PROVISIONAL APPLICATION

This application claims the benefit of U.S. Provisional Application, Ser. No. 60/028,414, filed on Oct. 15, 1996.

BACKGROUND OF THE INVENTION

Telephone is one of the most widely used communication equipments in the world. At first, it was merely a convenient tool to allow people to communicate while they are physically separated. Recently, many new products and services use telephone network as communication medium. Examples are electronic mails, videophone, the World Wide Web, etc. However, many users found out the performance of these products and services are below acceptable level. The main reason for the poor performance is that a large amount of data needs to be delivered from one point to another. Thus, the performance of all these products and services will improve with increasing bandwidth.

An example of the need for bandwidth is the development of teleconference devices that can communicate using regular telephone lines. Many companies have tried to developed videoconferencing products (such as videophones) since 1964. There are three major hurdles in the product development: cost, quality, and connectivity. A successful videoconferencing product must overcome these three hurdles. Currently, most homes are connected with regular phone lines, known in the industry as the Plain-Old-Telephone-System (POTS). The low bandwidth of POTS has been a great road block which keeps vendors from offering an acceptable videoconferencing product to the consumer market.

There were suggestions to use high bandwidth communication channels, such as Integrated Services Digital Network (ISDN) lines, to carry videophone communications. ISDN line has a bandwidth of 64 kilo-bits per second (Kbps), corresponding to a 1B channel, up to 384 Kbps, corresponding to a 6B channel. Most business videoconferencing products are based on ISDN because of the availability of the needed bandwidth. Unfortunately, ISDN is relatively expensive and is less popular than POTS in practically everywhere in the world. Still, many large corporations can justify installing ISDN-based videoconferencing products because they can save travel expenses and encourage business communications. However, conventional business videoconferencing products are not popular among small businesses, and are definitely unlikely to be justifiable for general public.

There are predictions that ISDN lines will become popular in the future. It is known that POTS takes decades to reach today's wide-spread usage, both domestically and internationally. Assuming that the growth of ISDN follows the historic growth path of POTS, it may take another 30 years before most household are connected to ISDN lines. Thus, it is unlikely that ISDN-based videophones will become popular in the near future.

There are other developing technologies, such as Asymmetric Digital Subscriber Line (ADSL), high bit-rate DSL (HDSL), very high bit-rate DSL (VDSL), Hybrid Fiber Coax (HFC), and Community Antenna Television (CATV). These technologies promise high bandwidth, typically higher than 1 Megabits per second or 1 Gigabits per second. However, they are either not bi-directional, not callable or not widely used.

Based on the above considerations, POTS is the best medium in the foreseeable future in terms of cost and connectivity. The worldwide infrastructure of POTS is mostly complete. Cost is low. The only hurdle is the bandwidth. Thus, it is desirable to develop ways to improve the bandwidth of POTS.

Various modulation schemes have been developed to improve the bandwidth of POTS. An example is the V.34 standard, which allows one single POTS line to communicate at 28.8 Kbps (or in some cases up to 33.6 Kbps). Looking at the technology advancements from the past, it is on the safe side to forecast that eventually faster MODEM modulation schemes over POTS will be introduced and standardized. However, it is recognized that there is a limit as to how fast data can travel along a POTS line.

Another example of the need for higher bandwidth is the Internet. During the past few years, many homes have been connected to the Internet. A typical user of Internet is attracted to beautiful multimedia images offered by the World Wide Web (the Web). However, it is found that retrieving these images over the Web is very slow because of the large data size and low bandwidth of POTS.

It can be seen from the above that it is desirable to increase the bandwidth of telephone communication with minimum cost and inconvenience to users.

SUMMARY OF THE INVENTION

The present invention involves a method for connecting a local and a remote device using a plurality of telephone lines. Once they are connected, the bandwidth of these lines can be combined. As a result, the local and remote devices will function as though they are connected using a high bandwidth telephone line.

In one embodiment of the present invention, the local device contains at least a first and a second line system, each is connected to a separate one of the telephone lines. For example, the first line system is connected to a first telephone line that has a first telephone number. Similarly, the second line system is connected to a second telephone line that has a second telephone number. The remote device dials the first telephone number to initiate a call on the first telephone line. The first line system of the local device receives the call, thereby establishing a first telephone connection. The first line system then sends the second telephone number to the remote device on the first telephone connection. Once the telephone number is know, the remote device can dial the second telephone number to initiate a call on the second telephone line. The second line system of the local device can answer the call, thereby completing a second telephone connection. The bandwidth of these two telephone lines can be combined.

In another embodiment of the present invention, all the telephone lines could have the same telephone number. The first line system of the local device notifies the remote device of this number and the total number of lines desired for connection. The remote device then dial this telephone number on different telephone lines.

The present invention also involves methods for identifying anticipated callers. One of the methods uses the caller-ID information. Another method, called the ring acknowledgment method (RACK), uses the ring-ringback pair generated by local central office. The remote device sends a ringback acknowledge message to the local device upon receiving the ringback signal from the local central office. As a result, the local device knows that the call is from the remote device. Variations of this method (such as interval RACK, marked RACK, and timed RACK) are also disclosed.

Examples of the application of these methods are videophones and modems.

These and other features of the present invention will become apparent from the following description when read in conjunction with the accompanying drawings.

BRIEF DESCRIPTION OF THE DRAWINGS

FIG. 3 is a flow chart showing a method for automatically connecting telephone lines in accordance with the present invention.

DETAILED DESCRIPTION OF THE INVENTION

The present invention is directed to a novel system and related methods for enhancing the bandwidth of telephone lines. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

(A) System Architecture

Figure 1:
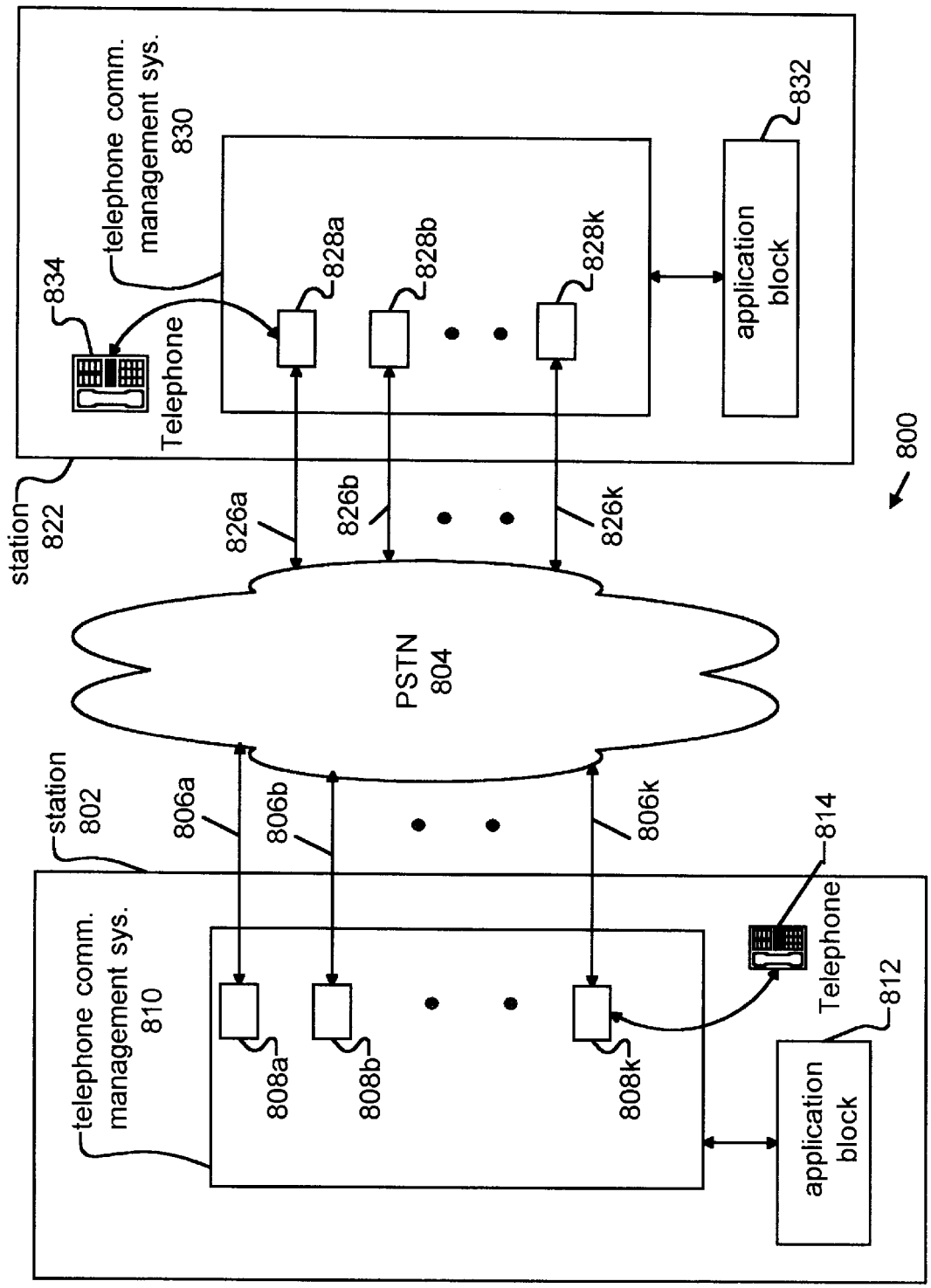
FIG. 1 is a schematic diagram of a communication system of the present invention.

FIG. 1 is a schematic diagram of a system 800 of the present invention that can consolidate the bandwidth of multiple telephone lines so as to improve the performance of the system. System 800 comprises a first station 802 that is connected to a public switched telephone network (PSTN) 804 through a plurality of telephones lines 806a, 806b, . . . and 806k. Each telephone line is terminated at a line system, such as line systems 808a, 808b, . . . and 808k. These line systems are part of a telephone communication management system 810 that interfaces with PSTN 804, processes data received from the line systems, and integrating the data so as to create a communication channel having a bandwidth that is substantially the same as the sum of the bandwidths of connected telephone lines. These line systems could be independent, or alternatively, they can pass messages and data between one another. Station 802 also contains an application block 812. This block contains components that use the data received from PSTN 804 to perform predefined applications (e.g., processing speech and video data for videophone applications). Thus, this block would be different for different products that use the present bandwidth enhancement invention.

In the present invention, the telephone lines are not dedicated to be used by the telephone communication management system 810. For example, a telephone 814 can be connected to telephone line 806k directly. Alternatively, telephone 814 is connected to a pass-through port of line system 808k which allows telephone 814 to be used if line system 808k is not using telephone line 806k.

System 800 also comprises a second station 822 that is connected to PSTN 804 through a plurality of telephone lines 826a, 826b, . . . and 826n. Station 822 has a similar structure as station 802, i.e., it contains a telephone communication management system 830 having a plurality of line systems 828a, 828b, . . . and 828n. Station 822 also contains an application block 832 that is similar to application block 812 in first station 802. The telephone lines 826a, 826b, . . . and 826n are not necessarily dedicated to be used by the telephone communication management system 830.

One aspect of the present invention is that the above telephone lines 806a, 806b, . . . , 806k, 826a, 826b, . . . and 826n are regular telephone lines. In one embodiment of system 800, these telephone lines are regular analog telephone lines provided by most telephone companies in the world (known in the industry as the Plain-Old-Telephone-System, or POTS). Thus, these telephone lines can be used for normal telecommunications purposes (e.g., each line can be used for voice communication or connected to a facsimile machine). One advantage of using regular telephone lines is that these lines have the lowest cost and widest connectivity. However, the method and system of the present invention can be applied to other kinds of telephone lines that may be widely used in the future. For example, the telephone line may be POTS line, wireless phone connection and cordless phone connection.

In the present invention, stations 802 and 822 could be close to each other so that their connection through PSTN 804 involves a local phone call. Alternatively, stations 802 and 822 could be across oceans so that they are connected through international phone calls. In other sections of this application, station 802 is referred to as the "local" station and station 822 is referred to as the "remote" station so as to present the present invention in a easy-to-understand manner. It should be noted that the terms "local" and "remote" are used merely to identify two different stations connected to PSTN 804. In providing communications having an enhanced bandwidth between stations 802 and 822, any number of telephone lines between 1 to k (assuming that n is larger than or equal to k) can be used. One aspect of the present invention is that the number of phone lines used for the connection is not preset. This number can be selected by a user or determined by an algorithm in application blocks 812 and 832 on a case-by-case basis. As an example, a user of a videophone system could elect to use all the available telephone lines for videophone purposes or leave some of the lines open for other purposes (e.g., waiting for an anticipated voice call).

Figure 2A:
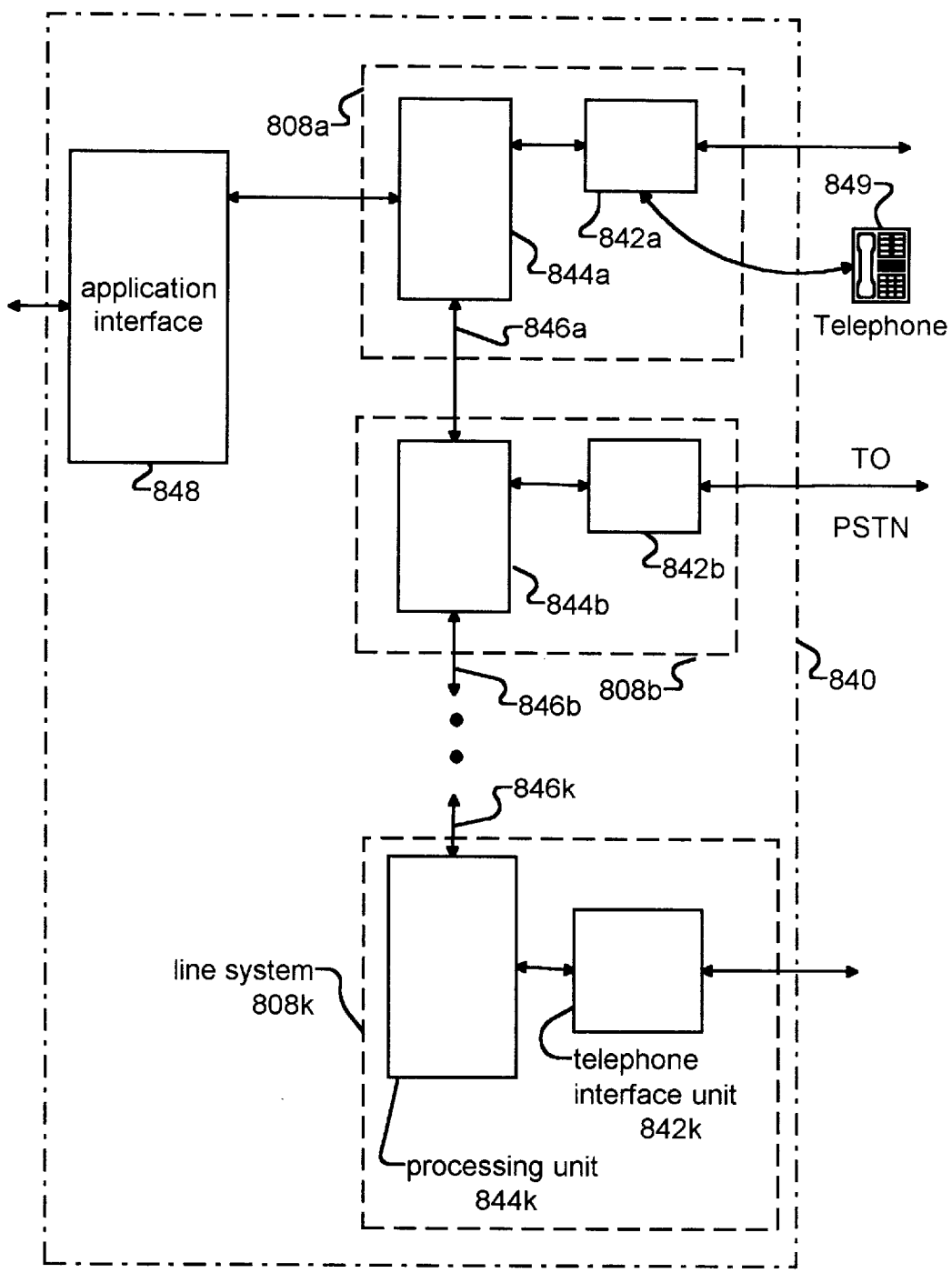
FIGS. 2A and 2B are block diagrams of two different telephone communication management systems of the present invention.

DETAILS OF THE TELEPHONE COMMUNICATION MANAGEMENT SYSTEMS (1) Linear Daisy Chain Configuration The structures of telephone communication management systems 810 and 830 are similar. Thus, only one is described here. FIG. 2A shows one embodiment of a telephone communication management systems 840. It contains a plurality of telephone interface units 842*a*, 842*b*, . . . and 842*k*, each connected to a respective processing unit (i.e., 844*a*, 844*b*, . . . and 844*k*). Each pair of telephone interface units and processing unit forms a line system (e.g., 808*a*, 808*b*, . . . and 808*k*) disclosed in FIG. 1. The telephone interface units convert digital data used in station 802 into signal that can travel through PSTN 804 (e.g., analog signal for POTS). Each processing unit controls its respective telephone interface unit and communicates with other processing units. In this embodiment, processing units 844*a*, 844*b*, . . . and 844*k* are connected, in a linear daisy chain manner, using communication links 846*a*, 846*b*, . . . 846*j*. For example, processing unit 844*a* can communicate with 844*k* via link 846*a*, unit 844*b*, link 846*b*, and link 846*j*. Management system 810 contains an application interface 848 which allows data received by the processing units to be communicated with application block 812 of FIG. 1. In this example, application interface 848 is coupled to processing unit 844*a*. Data received by other processing units are sent to application interface 834 via processing unit 844*a*. Application interface 848 combines the data originally received by various telephone interface units into a coherent data stream that can be used by application block 812. Similar, application interface 848 divides data received from application block 812 and distribute it to various telephone interface units (via the processing units) so that the data can be transmitted to PSTN 804 using a plurality of telephone line. As a result, the bandwidth of the system can be increased.

For a chain having k line systems, the total number of hops when each line system sends a piece of data to line system 808*a* is $(1+2+3+ \ldots +(k-1))=k(k-1)/2$.

A related architecture is to place line system 808*a* in the middle of the chain. In this case, the total number of hops is:

$$\text{hop} = \begin{cases} (k*k-1)/4 & (\text{when } k \text{ is odd}) \\ k*k/4 & (\text{when } k \text{ is even}). \end{cases}$$

If all data packets are passed to line system 808*a* without processing, this mid-chain architecture is better than the end-chain architecture. However, this architecture may not be necessarily superior in a distributed processing system.

In FIG. 2A, not all of the line systems (and the associated telephone lines) need to be active in order to enhance the bandwidth of station 802. The line systems that are not active only need to pass data from one adjacent line system to another adjacent line system. Of course, the more telephone line is used, the higher is the combined bandwidth.

It should be noted that application interface 848 could be coupled to any one of the processing units. It should also be noted that the above described blocks are functional description of physical components. In the construction of a physical telephone communication management system, a single physical device may be used to implement the functions of more than one block. For example, the job of application interface 848 and processing unit 844*a* could be implemented using a single microcontroller.

The telephone interface units of FIG. 2A are preferably analog modems when management system 840 is used with the POTS. In general, the telephone interface units are any device that can convert digital data used in system 800 into signals that meet the protocol of the PSTN. Thus, they are not limited to regular analog modems.

FIG. 2A shows a telephone 849 connected to telephone interface unit 842*a*. Many conventional modems contain a pass-through port so that regular telecommunication devices can be connected thereto. In the preferred embodiment, this feature can be incorporated into all the telephone interface units.

(2) Ring Configuration

Figure 2B:
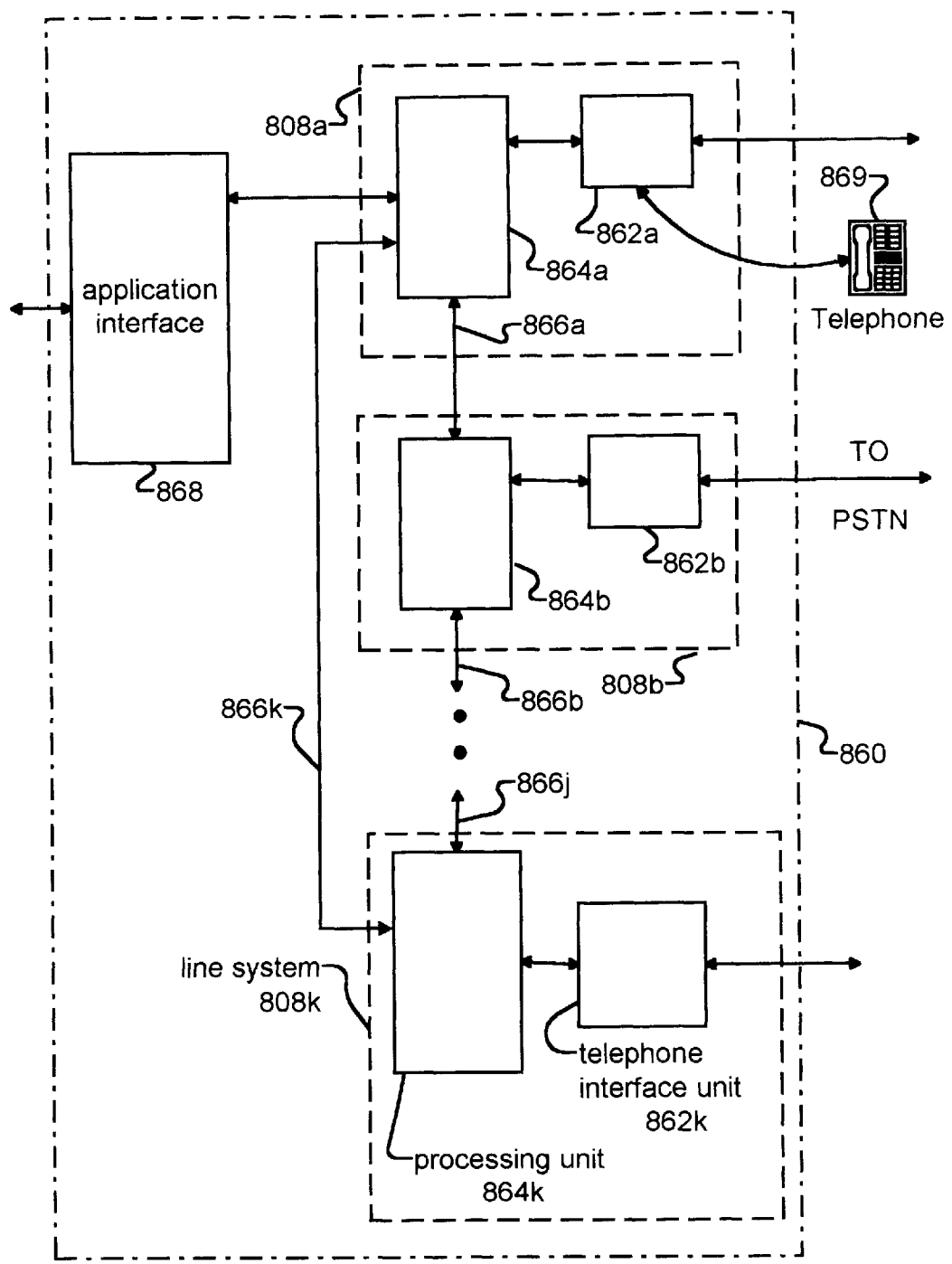

FIG. 2B shows another embodiment of a telephone communication management systems 860. It contains a plurality of telephone interface units 862*a*, 862*b*, . . . and 862*k* connected to respective processing units 864*a*, 864*b*, . . . and 864*k*. Processing units 864*a*, 864*b*, . . . and 864*k* are connected, in a ring configuration, using communication lines 866*a*, 866*b*, . . . 866*j* and 866*k*. As a result, processing unit 864*a* can communicate with 864*k* via a single link 866*k*, instead of going through a large number of processing units and links. FIG. 2B also shows that a telephone 869 can be connected to a pass-through port of telephone interface unit 862*a*. When FIG. 2A is compared to FIG. 2B, it can be seen that the architecture in FIG. 2B has a higher performance than that of FIG. 2A in terms of communication between the processing units.

For a system having k line systems, the total number of hops is given by:

$$\text{hop} = \begin{cases} (k*k-1)/4 & (\text{when } k \text{ is odd}) \\ k*k/4 & (\text{when } k \text{ is even}). \end{cases}$$

Note that the total number of hops for a k-ring approaches half of a k-chain, as k becomes large.

(C) Manual Methods for Connecting Line Systems

The following is a discussion of various methods for connecting telephone lines of station 802 to station 822. The methods described in this section are relatively simple. It requires a person ("caller") at station 802 and another person ("answerer") at station 822. More complex methods (with accompanying advantages) will be disclosed in other sections of the present application. In the methods of this section, it is assumed that station 802 is the station that initiate the connection by calling one of the telephone lines in station 822. Further, it is assumed that the telephone lines have different telephone numbers. For illustrative purposes, stations 802 and 822 are parts of two videophones.

One method is for the caller to use telephone line 806*a* of station 802 to dial the telephone number of telephone line 826*a* of station 822. The answerer answers the call (using, e.g., telephone 834 connected to telephone line 826a through line system 828a), and learns that the caller wishes to use his/her videophone. The answerer then tells the caller the telephone numbers of the extra telephone lines he/she wishes to be used in enhancing the bandwidth. The answerer also switch the telephone line 826a to line system 828a. The caller then dial these extra numbers using line systems 808b, . . . 808k. The line systems at station 822 can answer these telephone calls. As a result, the bandwidth of a plurality of telephone lines can be consolidated to carry the videophone data.

The disadvantage of this method is that regular telephones are required for the caller and answerer to communicate the telephone numbers. Further, the caller needs to dial additional numbers manually.

Another method is for the answerer (instead of the caller) to make the extra telephone calls. In this method, the caller uses telephone line 806a of station 802 to dial the telephone number of telephone line 826a of station 822. The answerer answers the call (using, e.g., telephone 834). The answerer then asks the caller the telephone numbers of the extra telephone lines he/she wishes to be used in enhancing the bandwidth. The answerer switches the telephone line 826a to line system 828a. The answerer then dials these extra numbers from individual line systems in station 822. The line systems at station 802 can answer these telephone calls. As a result, the bandwidth of a plurality of telephone lines can be enhanced.

Because this method is similar to the first method, it has similar disadvantages.

If the caller knows all the telephone numbers before hand, there is no need for the two parties to communicate information regarding the extra telephone numbers. However, the requirement of manually dialing multiple numbers remains an important disadvantage.

(D) Automatic Connection of Extra Lines

In the methods in this section, the telephone numbers of the telephone lines in station 822 are stored in their respective line systems or stored in line system 828a. Because the processing units of the line systems are connected to each other, the telephone numbers can be communicated from one processing unit to another.

One embodiment of this method is shown in a flow chart 200 of FIG. 3, it is assumed that the telephone lines have different telephone numbers, and that station 802 only knows the telephone number of one of the telephone lines of station 822 (e.g., line 826a). For convenience in presenting information in the flow chart, station 802 is labeled "local" and station 822 is labeled "remote." The telephone numbers of all the other telephone lines (826b, . . . 826n) of station 822 can be stored (prior to initiation of communication between stations 802 and 822) in line system 828a (step 202). This can be accomplished by (i) programming all these numbers into line system 828a by the user, or (ii) transferring individual telephone numbers from the line systems 828b, . . . 828n to line system 828a via the links between the line systems. In establishing communication, station 802 uses telephone line 806a to call the telephone number of telephone line 826a (step 204). Telephone lines 806a and 826a are connected when line system 828a answers the call (step 206). Line system 828a then sends some or all the telephone numbers of the rest of the telephone lines to line system 808a of station 802 via the connected telephone lines 806a and 826a (step 208). Line system 808a then sends each of these telephone numbers to a corresponding line system (808b, . . . ) via the links between the line systems (step 210). These line systems then call these numbers (step 212). The line systems (828b, . . . ) in station 822 answer the calls so as to connect telephone lines 806b, . . . to telephone lines 826b, . . . , respectively (step 214). As a result, stations 802 and 822 are connected with multiple telephone lines. The telephone communication management systems 810 and 830 of these two stations can consolidate the bandwidths of these telephone lines so as to allow transmission with an enhanced bandwidth.

A different embodiment of this method can be applied to stations which subscribe to the "rolling over" or "hunting" service offered by many telephone companies. The subscriber to this service is assigned one telephone number for multiple lines. When calls arrive, the telephone company can switch the calls to whichever available lines of the subscriber. One advantage of this service is that the subscriber only needs to give out one telephone number to its customers.

When station 822 is a subscriber to the rolling over service, station 822 only needs to notify line system 808a of station 802 to use the same telephone number and the number of lines available to establish the extra telephone connections. Line system 808a then passes this information to other line systems in station 802. Consequently, they can dial the correct telephone number to establish telephone connections.

In these methods, the user only need to dial one telephone number, and the remaining steps are handled automatically.

(E) Automatic Call Connection and Identification

In order to consolidates the bandwidth of the different telephone lines, it is necessary to make sure that the telephone lines of station 802 be connected to the corresponding telephone lines of station 822. However, these telephone lines are independent lines that could be connected to any telephone lines managed by the PSTN. Thus, unrelated parties can dial into these lines (either intentionally or by mistake), and may attempt connection if these lines are not busy. As a result, it is possible that the PSTN may connect telephone lines of an unrelated party to one of the telephone lines of station 822 while station 802 is attempting to connect its telephone lines to that of station 822. When this happens, system 800 may not function properly. One aspect of the present invention involve methods that can prevent unrelated parties from interfering with the establishment of telephone connection between stations 802 and 822 by distinguishing calls of unrelated parties from calls of anticipated callers.

(1) Caller-ID Method

Figure 4A:
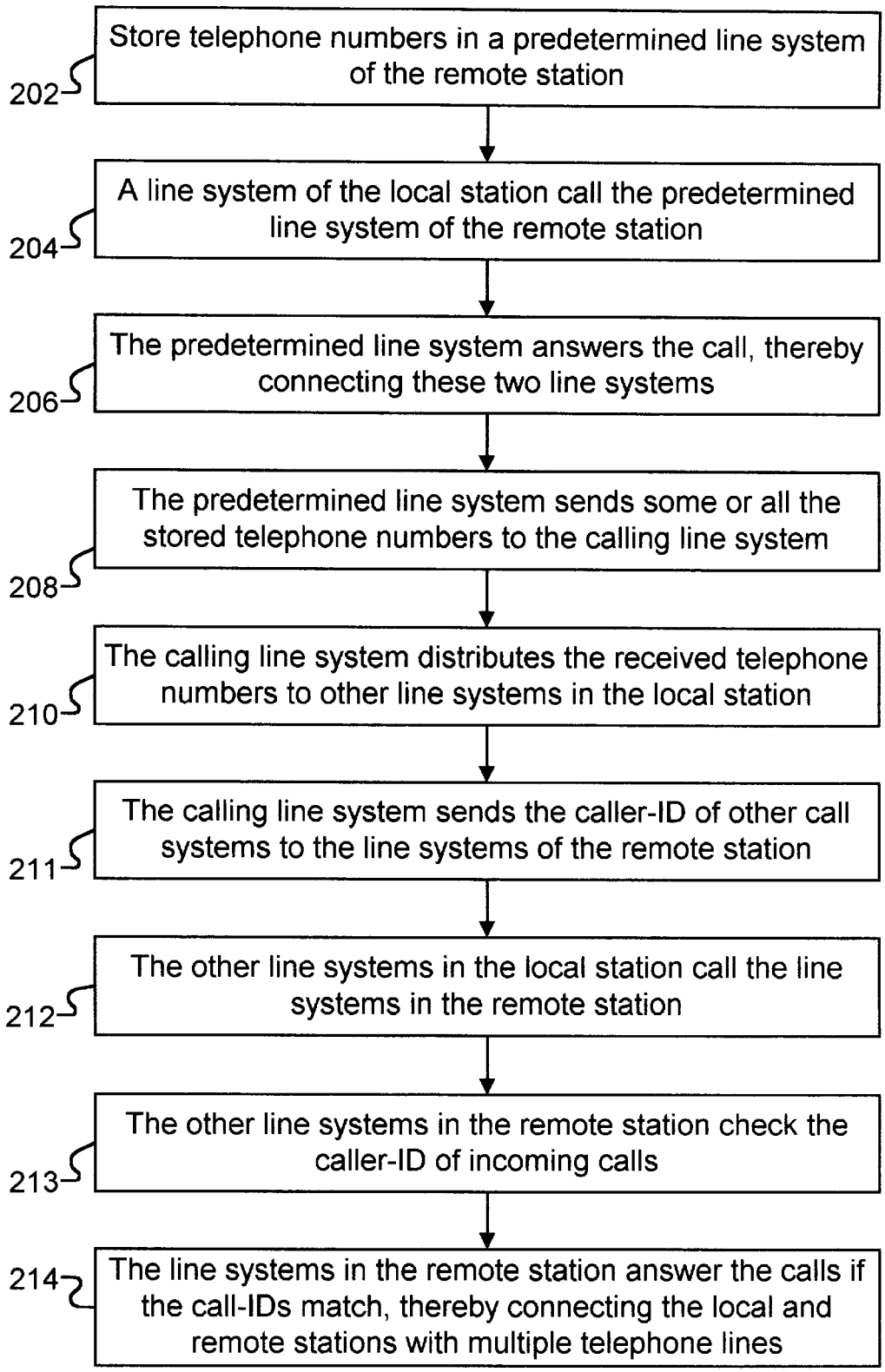
FIG. 4A is a flow chart showing a method of automatic connection using caller-ID information in accordance with the present invention.

One method is to rely on the caller-ID information provided by the PSTN as means for verifying the identity of a calling device. FIG. 4A is a flow chart 220 showing one embodiment of this method. Flow chart 220 is the same as flow chart 200 of FIG. 3 with two additional steps and a revised step 214. The first additional step (step 211) is performed between step 210 and 212. In step 211, the calling line system (i.e., line system 808a) sends the telephone numbers of the other line systems in station 802 to line system 828a of station 822. The second additional step (step 213) is performed between steps 212 and 214. In step 213, the line systems of station 822 check the caller-ID of calls on their telephone lines. Step 214 is revised so that the line systems of station 822 accept calls only if their caller-IDs match the anticipated numbers.

An drawback of this caller-ID method is that not all users subscribe to this service. Even if it is widely available, some users may choose to block the service. Thus, it is desirable to develop additional methods.

Figure 4B:
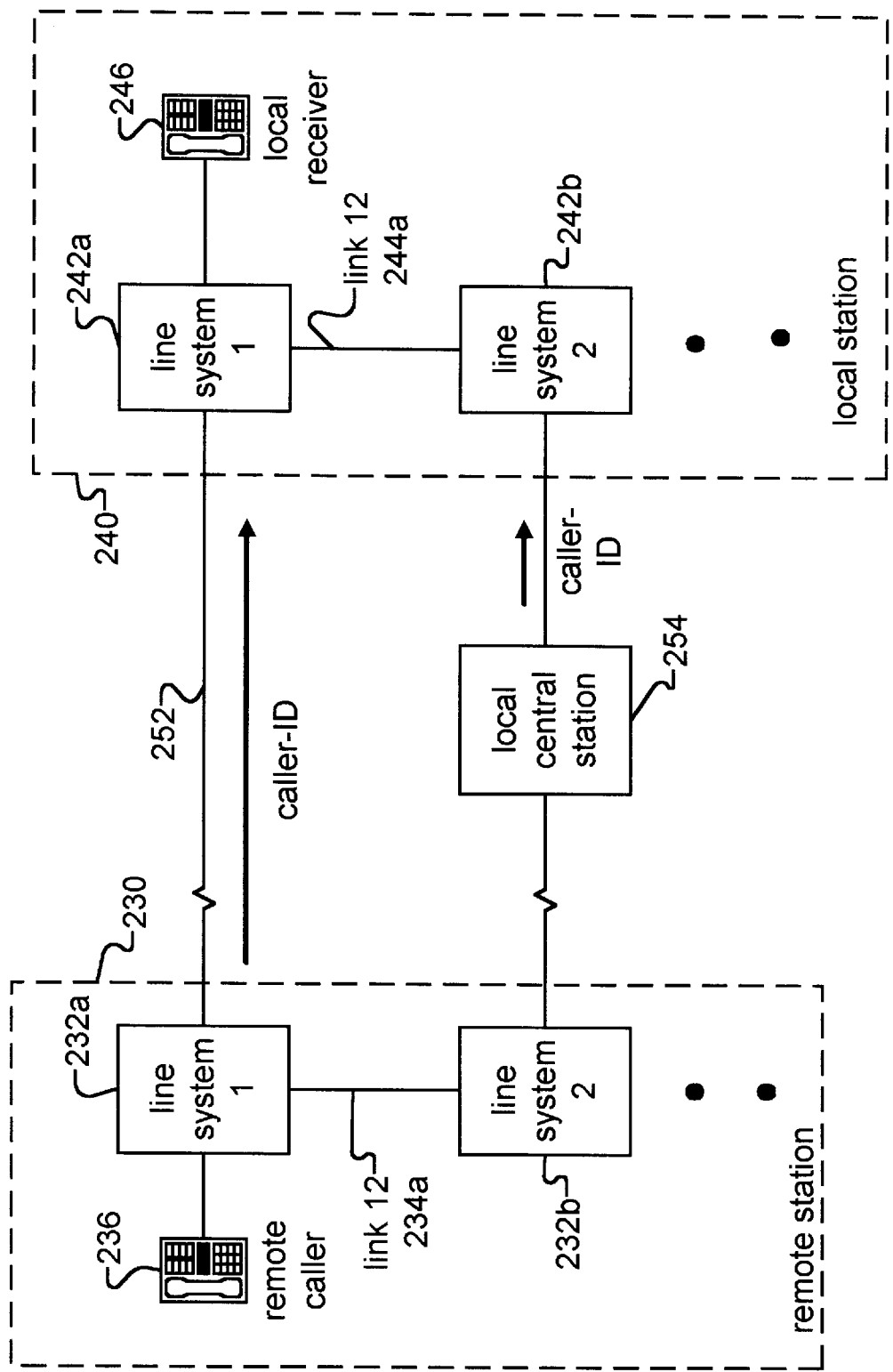
FIG. 4B is a schematic diagram showing a method of automatic connection using caller-ID information in accordance with the present invention.

In order to illustrate this method, a simplified block diagram of the system of the present invention is shown in FIG. 4B. It contains a remote station 230 and a local station 240. Again, the terms "remote" and "local" are used merely as labels to identify these two stations. Station 230 contains a plurality of line stations 232a, 232b, . . . . These line systems are linked, such as line systems 232a and 232b are linked by a link 234a. Station 240 contains a plurality of line stations 242a, 242b, . . . . These line systems are linked, such as line systems 242a and 242b are linked by a link 244a. A telephone 236 is connected to one of the line systems in station 230, such as line system 232a. Similarly, a telephone 246 is connected to one of the line systems in station 240, such as line system 242a. FIG. 4B shows that a telephone communication channel 252 between line systems 232a and 242a has been established, and the caller-ID information is sent by line system 232a to line system 242a. FIG. 4B shows a local central office 254 of a telephone company (which can be considered part of the PSTN) delivers caller-ID of line system 232b to line system, 242b.

(2) Ring Acknowledgment (RACK) Method

Another method, named Ring ACKnowledgment method (or simply RACK) may be used. This method examines the caller and receiver's ringing condition to identify caller. The RACK method is totally different from the caller-ID method. It can co-exist with the caller-ID method to fit various environment.

Figure 5A:
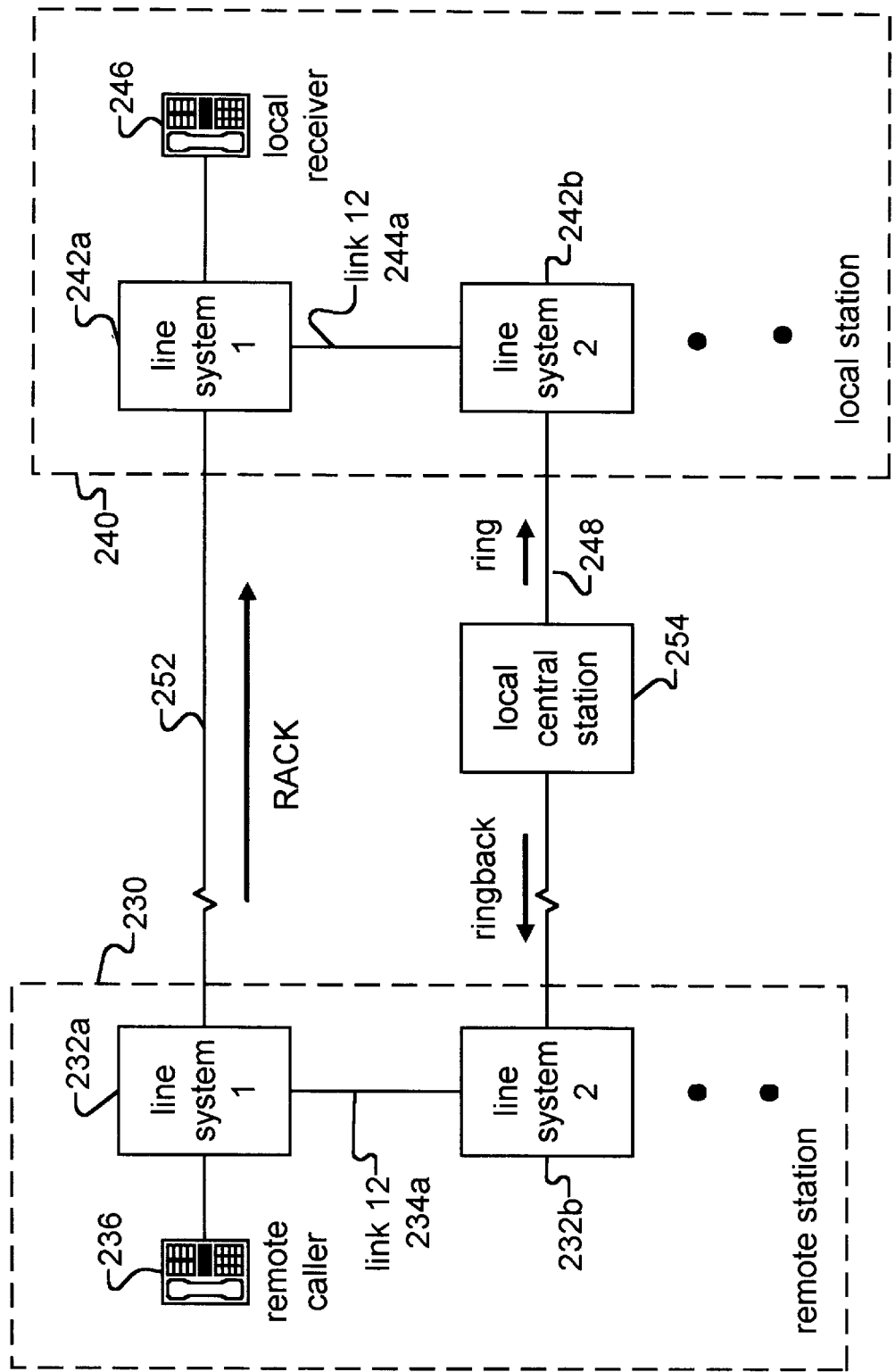
FIG. 5A is a schematic diagram showing a method of automatic connection using ring acknowledgment in accordance with the present invention
Figure 5B:
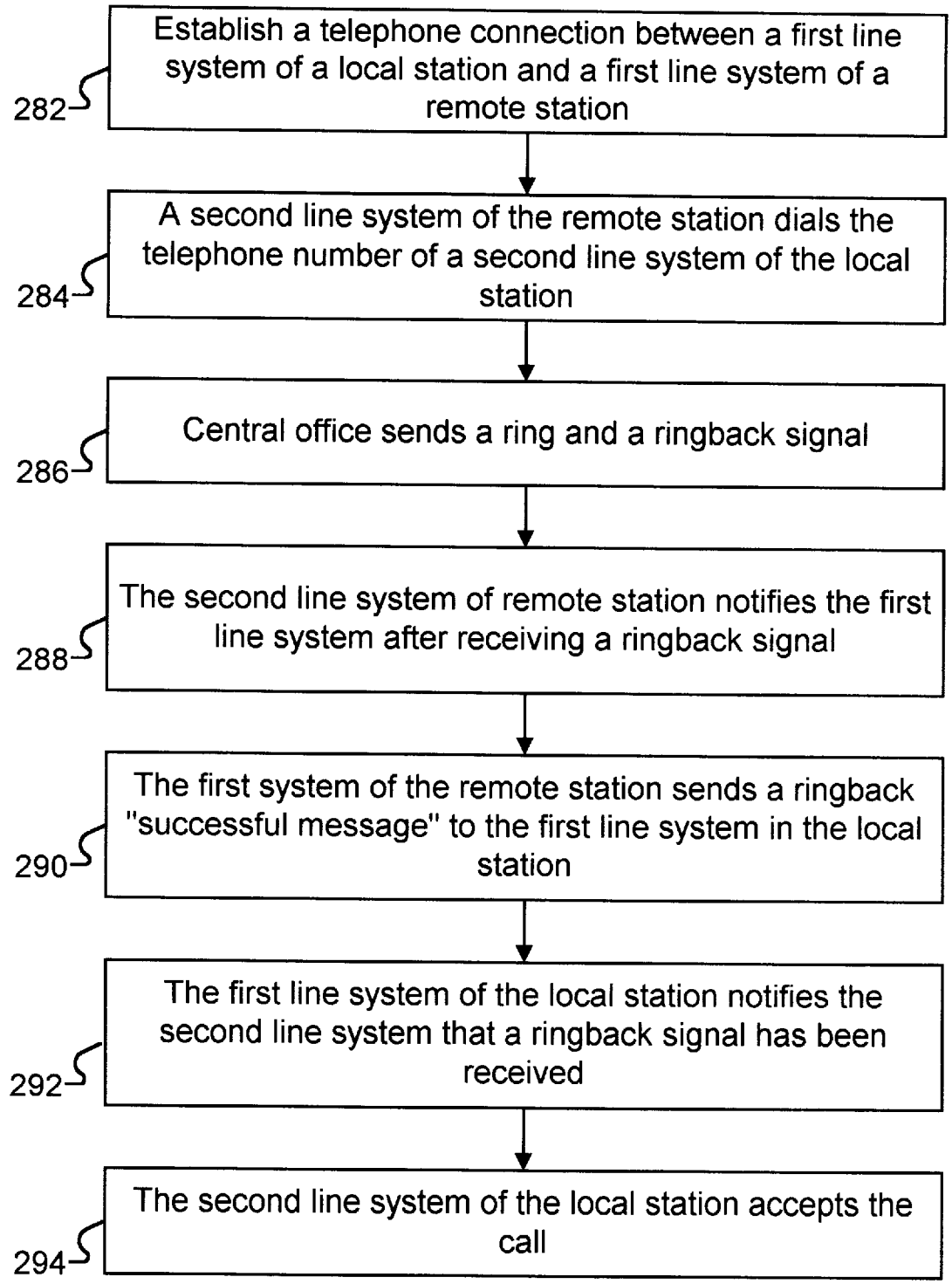
FIG. 5B is a flow chart showing a method of automatic connection using ring acknowledgment in accordance with the present invention.

FIG. 5A is used to illustrate this method. Blocks in FIGS. 4B and 5A having the same reference numerals refer to the same physical elements. FIG. 5B is a flow chart 280 showing the steps of this method. In step 282, telephone communication channel 252 is established. In step 284, line system 232b in remote station 230 dials the telephone number of telephone line 248. Once local central office 254 has completed switching, office 254 will send out two signals—a ring signal to the line system 242b and a ringback signal to the line system 232b (step 286). The ring signal is sent to the called device (e.g., telephone) to alert the called party that a call is waiting. At the same time, a ringback tone is returned to the calling device to indicate that the called phone is ringing. When line system 232b gets the ringback signal, it notifies line system 232a via link 234a (step 288). Line system 232a then sends a "ringback successful" message (via communication channel 252) to notify line system 242a that a ringback has received (step 290). Line system 242a notifies line system 242b via link 244a (step 292). Line system 242b then accepts the call because this call originates from line system 234a (step 294).

In most office environment, an internal switch equipment, such as PBX, may pick up the incoming call right away. In this situation, the internal switch equipment may generate its own ring and ringback signals. Thus, there is always a ring-ringback pair (from the local central office or the internal switch equipment).

This RACK method can also benefit when there are faulty situations. If there is no ring at line system 242b but a ringback acknowledgment is received, the remote station has probably dialed a wrong number. Line system 232b needs to check the telephone number and dial again. If line system 242b receives a ring but no ringback acknowledgment, the call is from a third party. Thus, line system 242b needs not answer the call.

In local station 240, any line system that has established telephone communication with remote station 230 could be used to gather the RACK and local ring information. Further, this line system (the "connected" line system) can make decision for the unconnected line systems regarding whether they should accept calls. The line system which is being called would simply follow the decision and instructions from this connected line system.

Alternatively, the connected line system may "broadcast" the RACK to all other line systems. In this case, decision of whether to accept a call is made by each line system instead of being made in a centralized manner by a single line system.

Besides the ringback signal, the remote station may get busy tone or other signals. These other signals may also be interpreted as messages such as NoRing, LineBusy, Voice, etc.. Consequently these messages may be used in line initialization status and/or constructing a RACK or no-RACK signal. Thus, RACK may be a true message or simply a "state" representing a successful dial.

(3) Interval Ring Acknowledgment (IRACK) Method

An IRACK message is a series of RACK messages which is the result of non-concurrent dialings. The IRACK method is a simple implementation of RACK. There is an interval between callings such that the order of rings appeared at local station is same as the order of their respective dialings. Because of the "one-by-one" dialing instead of simultaneous dialing, this type of dialing tends to have longer total connection time for all the intended lines. Further, the IRACK method allows only one ring-ringback signal pair at a time, thus the bandwidth gain will be at fixed increments.

Figure 6:
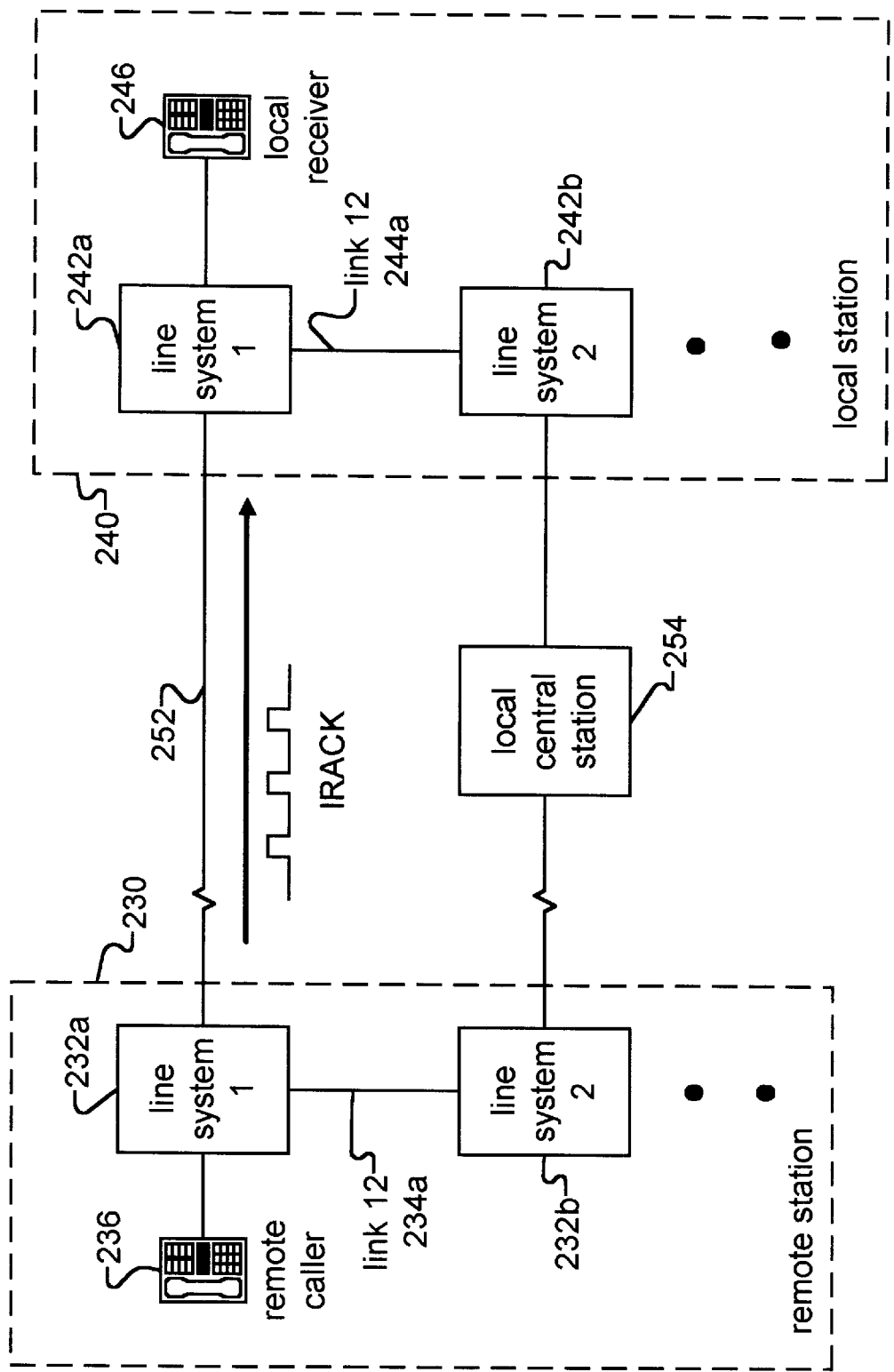
FIG. 6 is a schematic diagram showing a method of automatic connection using interval ring acknowledgment in accordance with the present invention.

FIG. 6 is a block diagram used to illustrate this method. Same elements in FIGS. 5A and 6 use the same reference numerals. There are many methods to generate IRACK message. The first method is to dial with a "differential time increments", say one second or two seconds. Differential time increment (DTI) is a time period between dialings so that the order of ringings at a receiving station is same as that of dialings. In using this method, the DTI should be long enough to compensate for the switching time of the PSTN. Suppose central office 254 switches a second call before a first call by half a second, then even though the first call precedes the second call by a quarter of a second, the second ring (arising from the second call) will be still ahead of the first ring (arising from the first call). In this case, the receiving order is not same as the calling order. To keep the order in this case, the DTI needs to be more than half a second.

A method to avoid answer calls from third parties is now described. It is assumed that telephone communication line 252 has already been established, and that other communications lines between the line systems in local station 240 and remote station 230 are waiting to be established. If line system 242b of local station 240 rings and a RACK also arrives soon after, then the call can be picked up and a second telephone connection is completed. Next, it is assumed that there is an outside caller dials at approximately the same time as a dialing by the third line system of the remote station 230. The third and fourth line systems in local station 240 will ring together as a result rolling-over dialing. When RACK arrives, the local station cannot tell which line is really from the third line system of remote station 230. As a result, local station 240 simply tells remote station 230 to abandon the call temporally so as to avoid confusion. The line systems in local station 230 would not answer both calls. The third line system in remote station 230 will retry later. In summary, local station 230 will only pick up a call when there is a clean ring-RACK present.

An alternative method is a "handshaking" method. Basically, the remote station only initiates a new call based on a "Next-Line-Please" request from the local station. As a result, the sequences of both sides are always matched.

(4) Marked Ring Acknowledgment (MRACK) Method

Figure 7:
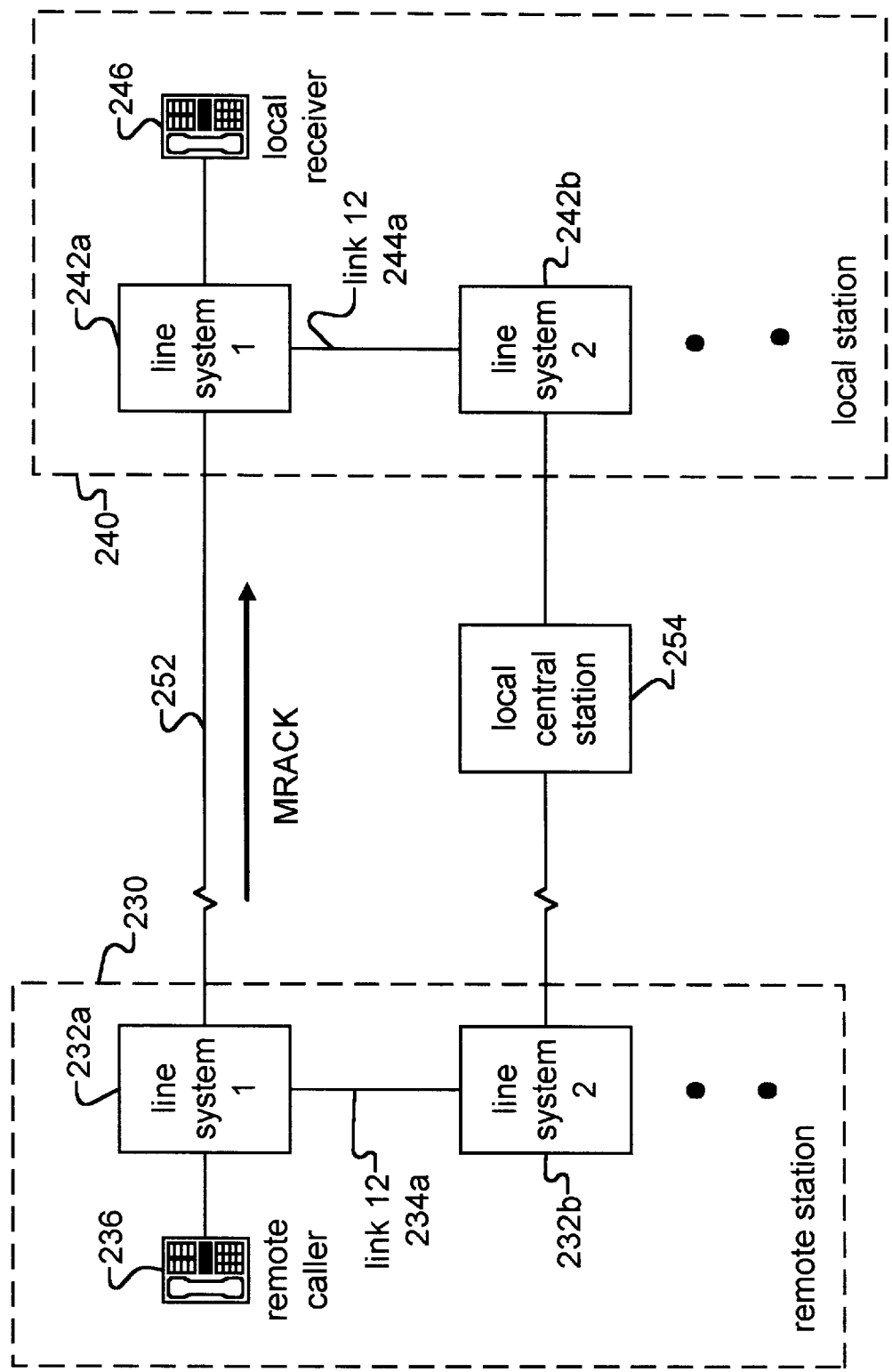
FIG. 7 is a schematic diagram showing a method of automatic connection using marked ring acknowledgment in accordance with the present invention.

In some cases, it would be helpful if identification information (such as the telephone number) can be added to the RACK. A method, called marked RACK (MRACK), is the same as RACK with the exception that it adds the telephone numbers of the line systems into the RACK message. FIG. 7 is used to illustrate this method. Same elements in FIGS. 6 and 7 share the same reference numerals. Because MRACK carries the telephone number information, it is more suitable for a station with numerous lines.

If local station 240 subscribes to rolling-over dialing, the phone number being dialed are all the same. In this case, it is less likely that the MRACK method will be used. If both local station 240 and remote station do not subscribe to rolling-over dialing, an absolute mapping of the line systems at both sites can be generated.

(5) Timed Ring Acknowledgment (TRACK) Method

Figure 8A:
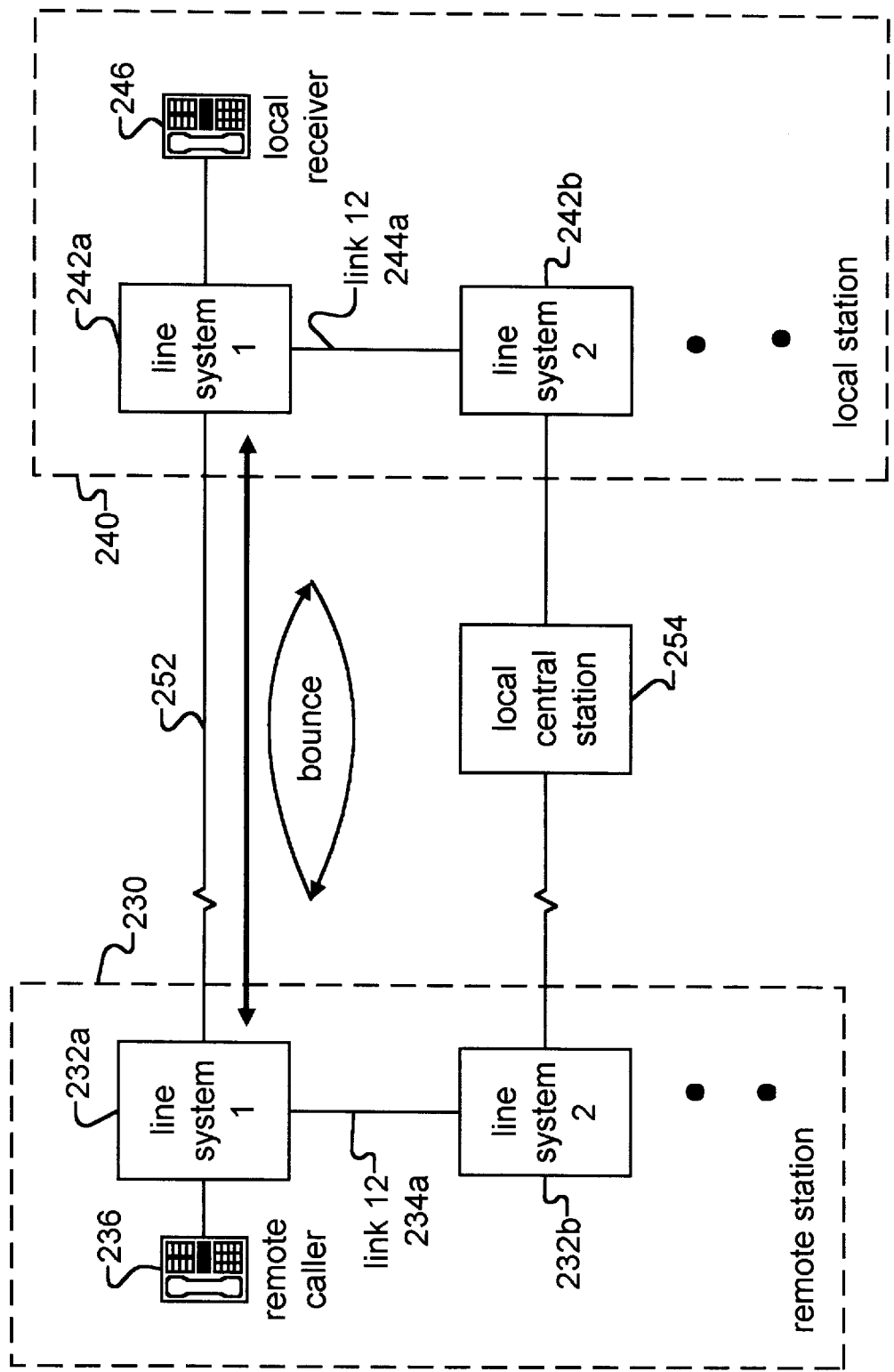
FIG. 8A–8D show a method of automatic connection using timed ring acknowledgment in accordance with the present invention.

For a more stringent identification, the previous RACK method can be enhanced further. A new method called a "Timed Ring ACKnowledgment" method (or TRACK) is now described. This method identifies the caller by measuring the time of delay between ring signal and ring acknowledgment message. FIG. 8A is used to illustrate this method. Same elements in FIGS. 8A and 7 share the same reference numerals.

Figure 8B:
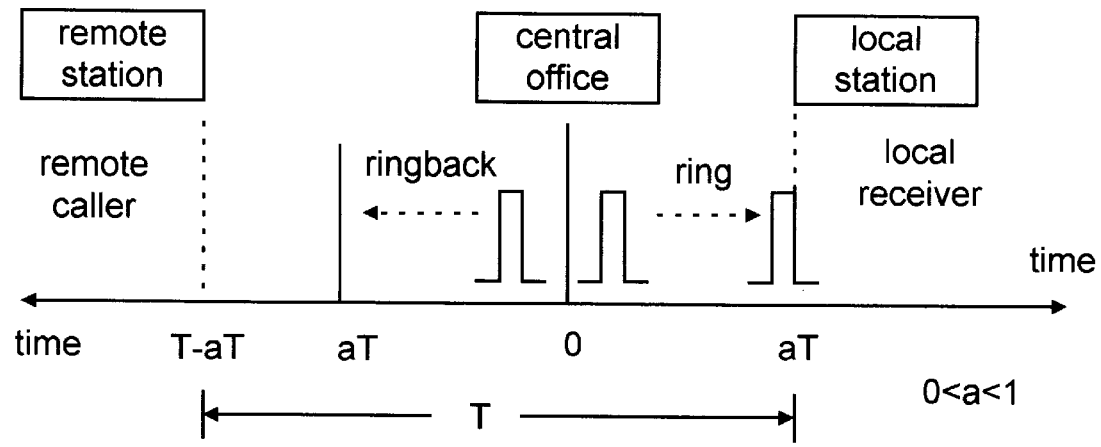

FIG. 8B is used to illustrate the timing between the ring and ringback signals. In FIG. 8B, T is defined as the total signal traveling time between a local station and a remote station. Thus, if aT (where $0<a<1$) is defined as the portion of T from a central station to the local station, then (T−aT), which is the total time T minus the above portion, is the portion of T from the central office to the remote station. This information allows for identification of the caller, as explained below. Normally, the central office is closer to the local station than to the remote station (unless the call is a local call).

The time T can be independently measured using telephone communication line 252 between line systems 232a and 242a. A "bouncing message" can be sent by one of the line systems (such as line system 232a) to its connected line system (such as line system 242a). The connected line system simply "bounces" the message back immediately. When the message returns to the sender, the time between sending and receiving is measured. The time T is equal to half of the total round-trip time.

Figure 8C:
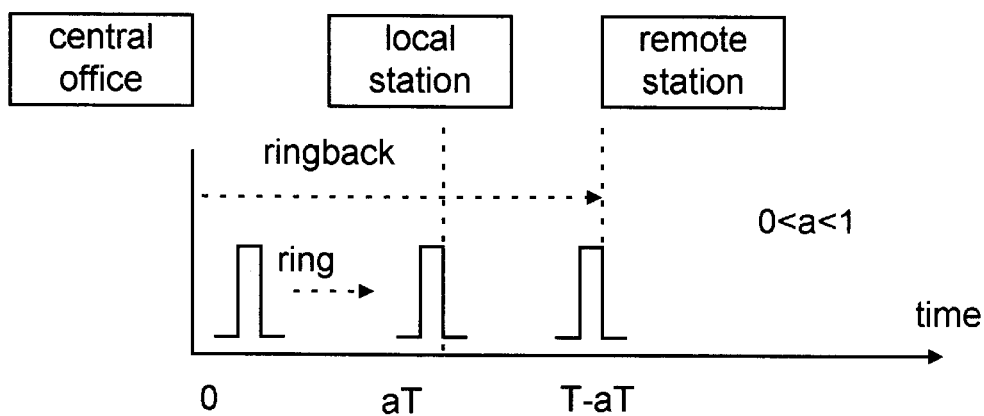

Once the time T is determined, it can be used to identify the caller. For explanatory purposes, FIG. 8C shows the timing diagrams for the ring signal and the ringback signal in a way that overlap each other. Essentially, FIG. 8C is the same as FIG. 8B with the left hand side of FIG. 8B flipping over to the right. It is assumed that the central office sends out both ring and ringback signals at about the same time after a call is dialed. Thus, the origin of both signals are shown in FIG. 8C to be the same.

Figure 8D:
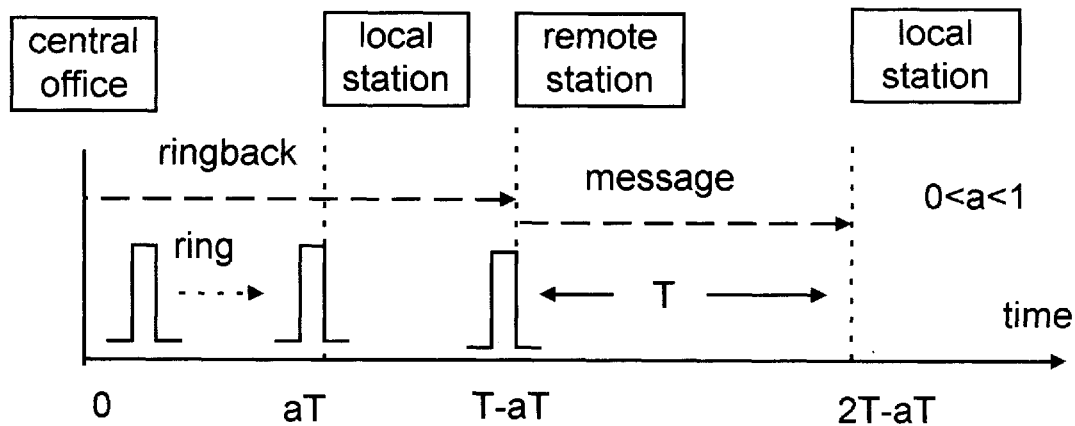

It is further assumed that the response time within all stations is insignificant comparing with the telephone line transmission delay. After line system 232b of remote station 230 dialed the telephone number of line system 242b of local station 240, it receives a ringback signal. Line system 232b then sends out a "ring acknowledgment" message to the line system 242b through the established telephone communication line 252. This acknowledgment message will arrived at line system 242b at time T+(T−aT). The extra time T is the time taken for the message to travel through line 252 (assuming that both the telephone lines connecting the local and remote stations share the same transmission delay. This is shown in FIG. 8D, which is essentially FIG. 8C with an added portion at the end.

Based on the above, it is possible to calculate the time difference($\Delta t$) between receiving a ring and an acknowledgment message at the line system 242b:

$$\Delta t = (2T-aT)-aT = 2T-2aT = 2(1-a)T \quad (1)$$

Since $0<a<1$, then $$0<\Delta t<2T \quad (2)$$

Equations (1) and (2) are the analytic results of the TRACK method. If the actual time difference is much larger than the calculated $\Delta t$, the call is unlikely to be originated from the anticipated caller.

The range of timing can further be narrowed. In most long-distance calls, the central office is assumed to be closer to the local, i.e., $0<a<\frac{1}{2}$. Then equation (1) for such phone calls could be narrowed down to equation (3) as the following.

$$T<\Delta t<2T \quad (3)$$

The farther is the caller from the local station, the closer to 2T that $\Delta t$ should be. Likewise, the value of T for a domestic long distance phone call should be very different from international and local calls. A table of range of T values for various areas may be implemented and maintained in a machine readable form for reference (e.g., in a ROM). Equation (1) can also be improved by adding the delay component of the line systems and/or stations. Also, the direction of both message and measurement could be taken into consideration.

(F) Application of These Identification Methods in Various System Configurations There are a number of physical configurations and services for the local and remote stations. Basically, a station could subscribe to two types of services: distinct number dialing and same number dialing. Same number dialing is when receiver utilizes "rolling-over" or "hunting" service so that callers dial only one main number for all line connections in a station. This type of service is typically used in business offices having only one "main" number. Rolling-over is a service offered by telephone company. Otherwise, it is distinct number dialing in which callers need to dial an individual number associated with each line.

In identifying expected callers, the above described caller-ID method could be implemented if both parties subscribe to this feature offered by telephone companies. Caller-ID could be the most reliable method with distinct number dialing because both ends of each line basically know which number to dial and who is dialing. For same number dialing, the receiving station still can get one or many caller numbers to match with. Thus, the caller-ID method could achieve the identification. The drawback of this method is that caller-ID may not be universally available.

The RACK method is adequate for a simple and more relaxing environment where phone calls hardly overlap. Also, for a station with only two telephone lines which does not share the second telephone line with any other stations, the RACK method works fine with both types of dialing.

However, the RACK method may have difficult in handling a station with three line systems. This occurs when two of the line systems ring simultaneously but there is only one RACK. It is difficult to determine which call is the expected call. If distinct number dialing is used, the solution is to use the MRACK method. However, if same number dialing is required, the MRACK method cannot be used to identify the correct ringing line system.

Extending the above result to a n-line configuration, the MRACK method should work where all lines (except the connected line) are dialed simultaneously and some lines start ringing. As noted above, the MRACK method fails if same number dialing is used.

Figure 9:
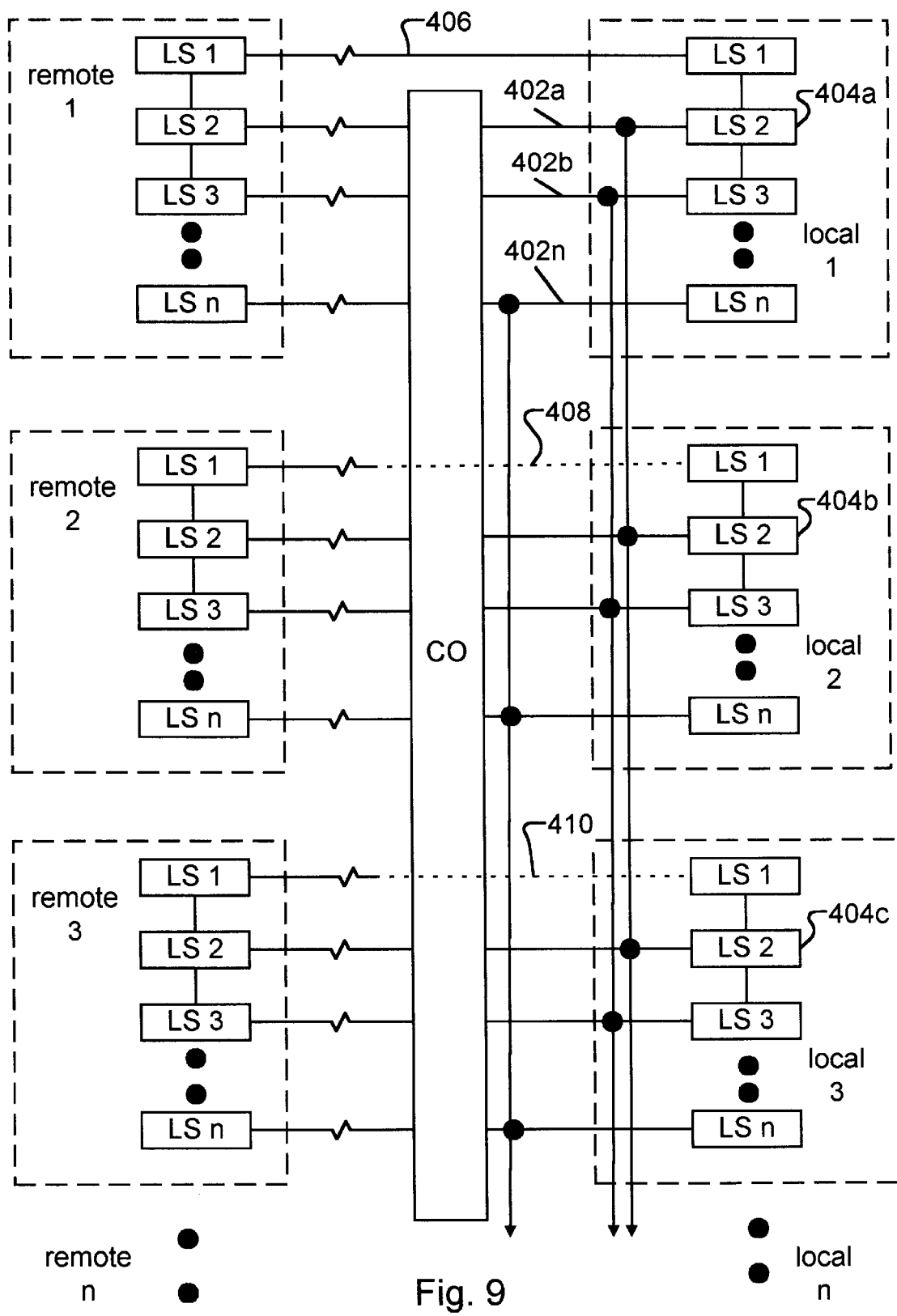
FIG. 9 is a block diagram showing a configuration in which some of the telephone lines are shared by more than one stations in accordance with the present invention.

The situation where one or more telephone lines are shared by more than one station is now described. FIG. 9 shows a system in which some of the telephone lines are shared by several line systems. For example, telephone lines 402a is shared by line systems 404a, 404b, 404c, . . . . Similarly, telephone lines 402b, . . . 402n are shared. Note that there is at least one telephone line in each station, such as telephone lines 406, 408 and 410, that is not shared.

For the case of a shared 2-telephone line configuration where multiple local stations may compete simultaneously for the same shared telephone line (e.g., line 402a), the RACK method could be used. This is because there is no confusion of which station should get line 402a because the RACK message is received by one station only.

For the case of a shared 3-telephone line configuration where multiple local stations may compete for telephone lines 402a and 402b, the MRACK method works fine with distinct number dialing. Similarly, the MRACK method also works with distinct number dialing for a shared n-line configuration where multiple local stations may compete for a large number of available lines.

It can be seen from the above that the MRACK method always works with distinct number dialing. With same number dialing, the RACK method functions with a two line configuration, but not for three lines and up.

The TRACK method could be useful universally. If both T and α are well specified so that calls must meet certain tight time slot, the TRACK method can be a powerful tool for all types of calls.

Unlike caller-ID, RACK, or MRACK methods, the TRACK method is not absolute. If there are two ring-RACK pairs which are really close, say (1/100)T, the TRACK method may be ineffective. However, it could be enhanced if the TRACK method is to be supplemented with the RACK method together. To save the dialing and central office switching time, the TRACK method can also be used in conjunction with the IRACK method.

(G) Application to Videophone Systems (1) Cost and Marketing Considerations

One application of the present invention is in the field of videophone connected using POTS. Conventional videophones use Integrated Services Digital Network (ISDN) lines to provide connection between videophones. Recently, the International Telecommunication Union (ITU) accepted a new standard, called Recommendation H.324, for using the POTS to provide connection to videophones. One of the problems of using POTS is that the picture quality may be unacceptable because of the low bandwidth of POTS. The present invention provides for enhanced picture quality by combining more that one POTS lines in a videophone system.

Figure 10:
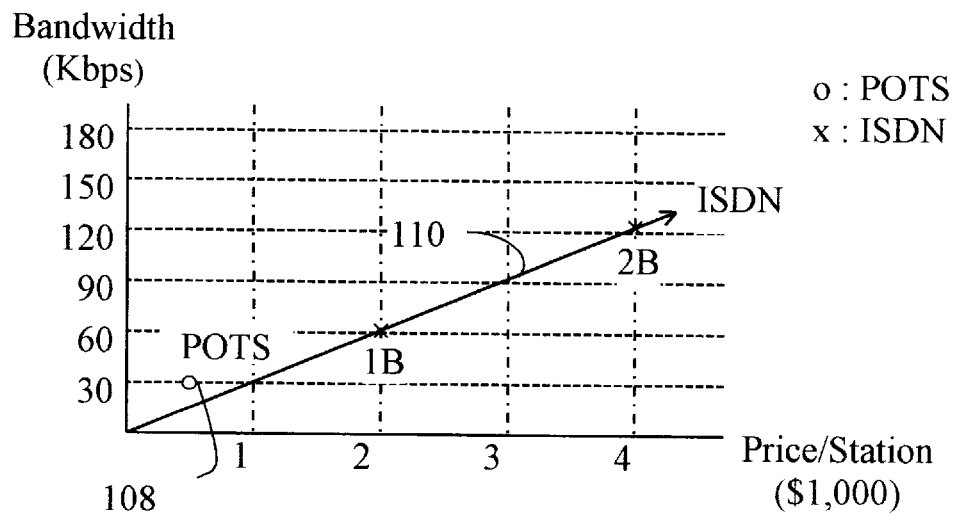
FIG. 10 is a graph showing the difference in price and bandwidth of POTS and ISDN lines.

In order to illustrate the advantages of the present invention, the cost and bandwidth of POTS and ISDN are compared. FIG. 10 shows the difference in price and bandwidth between POTS and ISDN for a typical application. It can be seen that POTS has a lower price per station and a lower bandwidth when compared to ISDN. Note that a POTS channel allows only one maximum speed rate today. Thus, FIG. 10 shows only one point 108 for POTS in the whole graph while ISDN shows two points (1B and 2B) falling on an inclined line 110. The first point corresponds to the data rate of a basic-rate ISDN (BRI) while the second point corresponds to twice the BRI.

Figure 11:
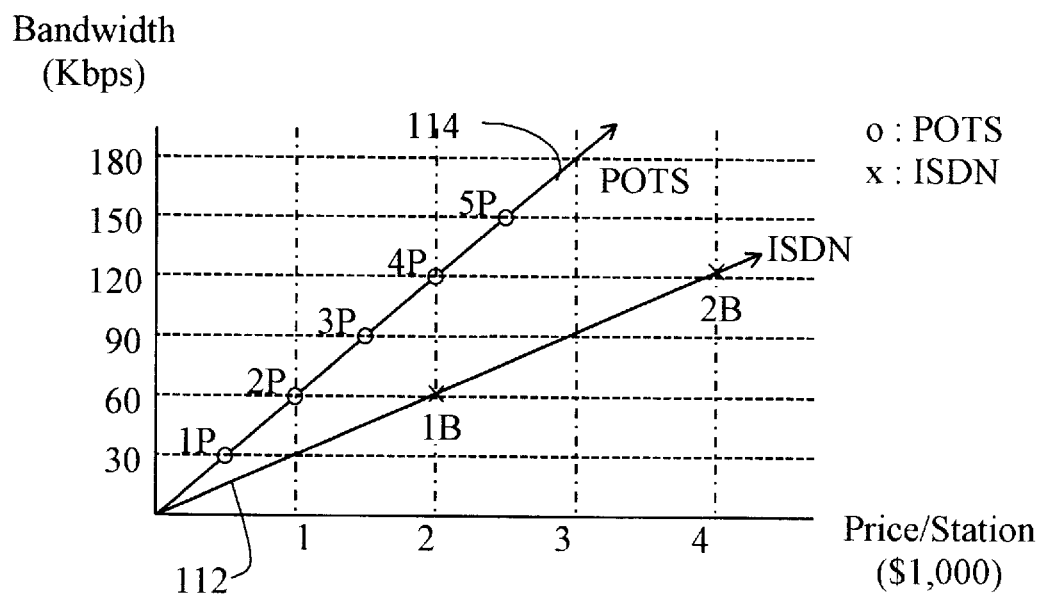
FIG. 11 is a graph showing the difference in price and bandwidth of ISDN lines and a plurality of POTS lines consolidated in accordance with the present invention.

The present invention allows multiple POTS channels to be used simultaneously to achieve higher bandwidth. As a result, videoconferencing products can be designed to use these POTS channels simultaneously. FIG. 11 is similar to FIG. 10, except that it shows the effect of the invention. Note that there are two inclined lines, a line 112 for ISDN and a line 114 for POTS. Line 112 is similar to line 110 of FIG. 10. Line 114 is a new inclined line having multiple price-bandwidth points. Notice that the new POTS line 114 has higher price/bandwidth ratio compared to line 112. The POTS entry cost is also significantly less than ISDN setup. Because of the worldwide POTS installation base and less incremental cost, the potential will be phenomenal for POTS products based on the present invention.

It is expected that the price of ISDN channels would decrease over time. However, the price of POTS would also decrease over time. Consequently, POTS will have the same or similar cost advantage over ISDN in the foreseeable future.

It is known in marketing experience that every product need to fulfill certain customer needs at certain price point. If a product could not meet the basic requirement for the needs, market acceptance may become a major issue. Although bandwidth is one key element to meet the performance requirements, videoconferencing products must also meet human interface requirements in order to be successful.

Imaging two hearing impaired person doing a visual call with ISL (International Sign Language), it is important that the display must be fast enough to catch every hand sign. If the equipment is slow, the person may need to slow down the hand motion. If it is beyond bearing by a typical person, the equipment is not suitable for the application. The same situation may also occur during voice communication. Suppose the equipment has a one-second delay, then there will be situations that the listener speaks before the previous response from the remote site has reached the listener. Some users may tolerate the inconvenience. However, if the product has a five-second delay, the product will hardly be accepted by most.

Figure 12:
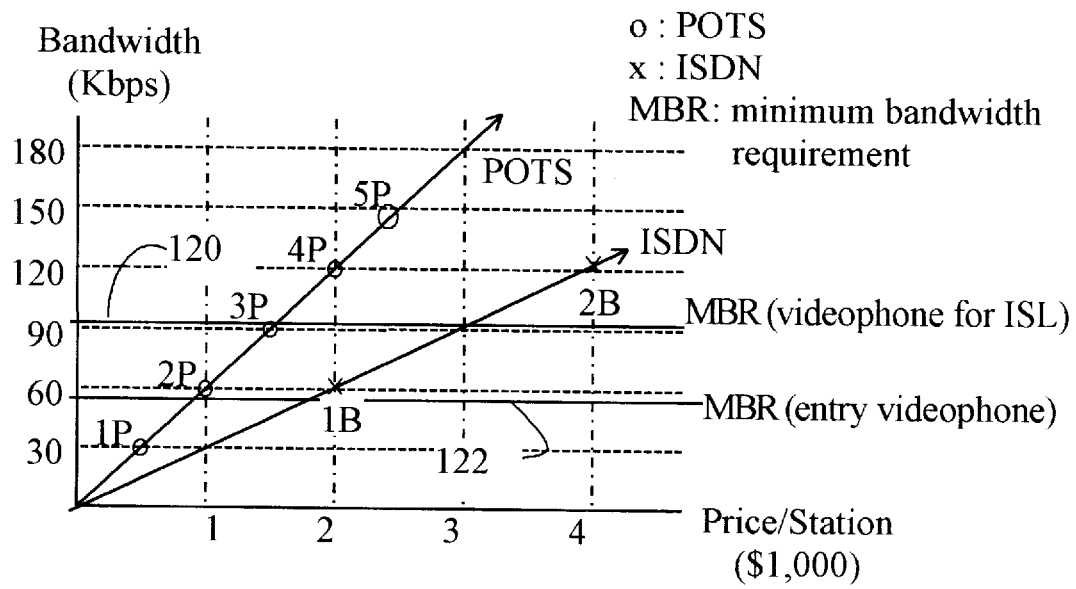
FIG. 12 is a graph showing the minimum bandwidth requirement, price and bandwidth in accordance with the present invention.

Today's advancement in silicon technology contributes greatly to computing equipment. The inexpensive computing power, along with new compression-decompression theories, enables the videoconferencing station to attribute less and less on the over-all response delay. Instead, the line bandwidth is becoming more a bottleneck. To enable better exploration into the issue and for simplicity, a number called Minimum Bandwidth Requirement (MBR) is introduced here. Each specific application for a specific market segment has its own MBR rating. The MBR of current business videoconferencing is between 64K and 128K, same as 1B and 2B of ISDN. This rate allows for the combination of voice, picture, and data altogether. For entry business level, MBR of 64K is acceptable but may cause some interrupt when undergo data exchange. Consumer videophone application exchanges voice and picture only, and there is no data exchange. As a result, the MBR of a general-purpose videophone is less and should be within the range of 30K to 64K, which is in between one POTS and one ISDN channel. FIG. 12 shows estimated videophone MBR indications on top of price-bandwidth curves. Indication 120 is for an ISL videophone while indication 122 is for a general-purpose videophone. Based on these indications, a general-purpose videophone would require a total bandwidth of approximately one and a half POTS lines.

Figure 13:
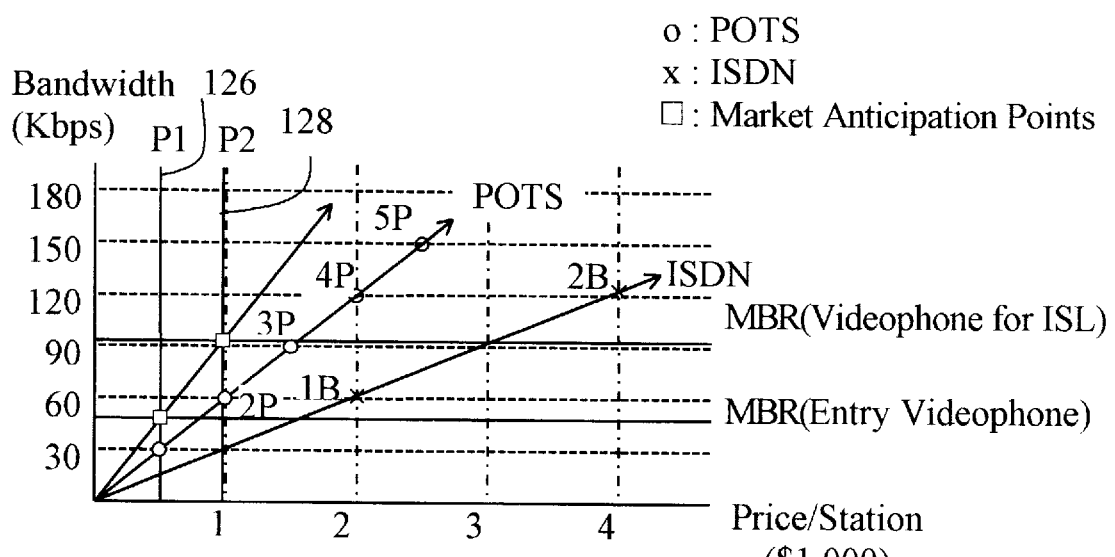
FIG. 13 is a graph showing the minimum bandwidth requirement, price, bandwidth and various price points in accordance with the present invention.

In addition to examining the bandwidth requirement, it is necessary to consider the price points of various products. FIG. 13 is an exemplary graph showing estimated acceptable price point for entry-level videophones (shown as line 126) and ISL videophone (shown as line 128). Assuming that the initial acceptable price point for an entry level videophone is $500,, the price point for ISL videophone is about $950 (from the result of linear interpolation). This ISL videophone would take the total bandwidth of approximately three POTS lines.

As an example, it is assumed that there is a videophone which uses one regular phone line and costs $1,000. According to FIG. 13, it does not meet the entry MBR and the price point is about three times higher than the acceptable level. This product for sure is going to have a rough sale. Even if the price of the product is lowered to $300, most users would find it inconvenient and frustrating to use because it is below the entry MBR.

One possible solution is to lower the entry MBR by improving the compression protocol on both ends. In this way, less data would need to be exchanged because data is compressed more. Another method is to improve POTS modulation for higher data transmission speed. Either method will take time for the technology to get mature and eventually new sets of international standards have to be established for worldwide connectivity.

Several assumptions (including MBR numbers and acceptable price points) are provided in the above discussion. It should be noted that the same conclusion would be reached when other assumptions are used. These assumptions are provided for easy understanding of the concept.

The present invention involves a system for allowing multiple POTS lines to be combined, at will, so as to increase the data transmission rate available to data communication products using POTS lines. Some of the benefits and possible applications of the present invention should be apparent from the discussion of the previous paragraphs. A description of the technical details is provided below.

(2) Structure of the Videophone System of the Present Invention

Figure 14:
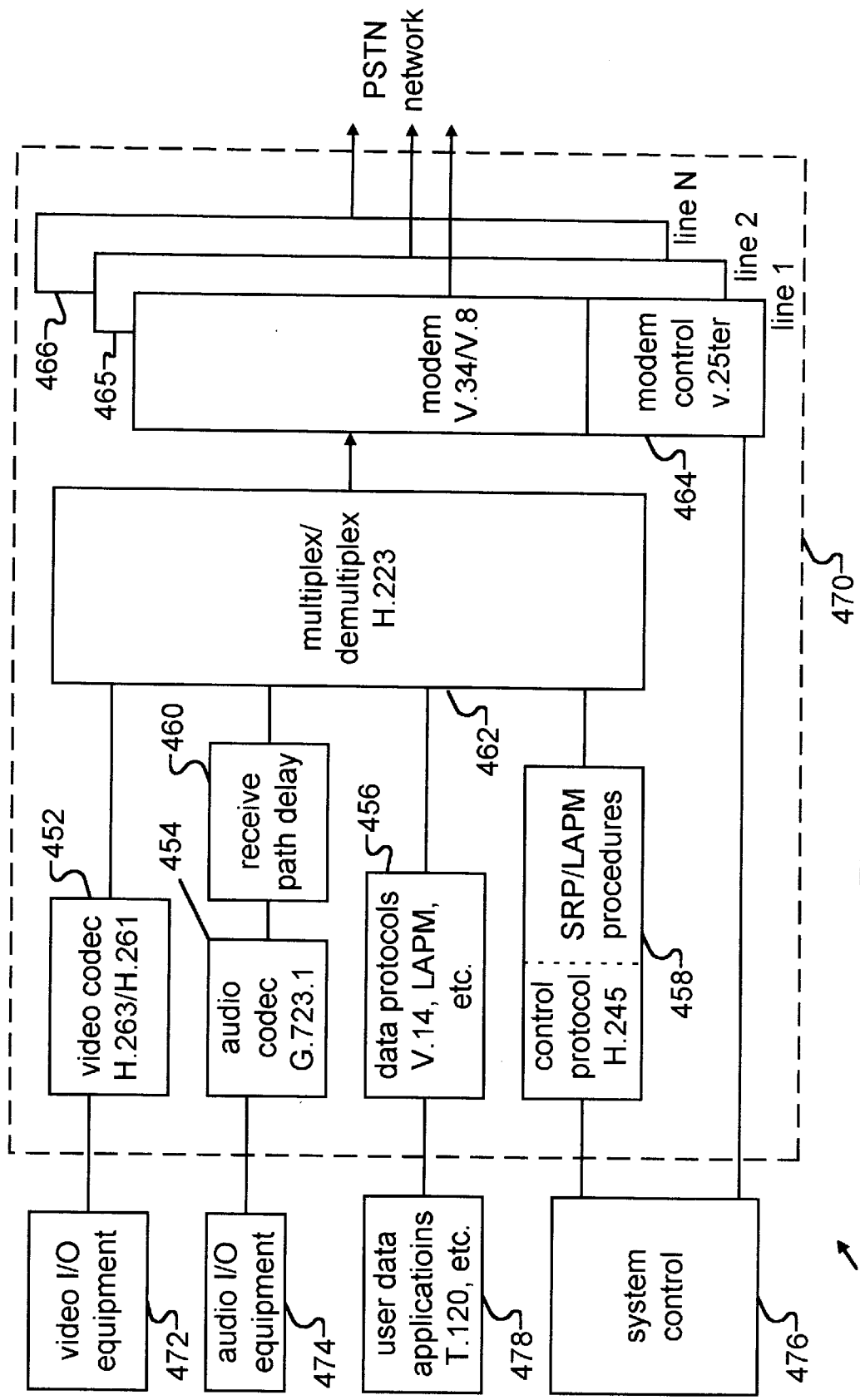
FIG. 14 is a block diagram of a videophone system of the present invention.

FIG. 14 shows a block diagram of a videophone system 450 of the present invention. It contains a component 470 including a video codec 452 that meets the H.263/H.261 standard, an audio codec 454 that meets the G.723.1 standard, a data protocols block 456, a control protocol block 458, a receive path delay 460, a multiplex/demultiplex 462 that meets the H.223 standard, and a plurality of modems (such as modem 464–466) that meet the V.34/V.8 or V.34/V.8bis standard. It should be noted that ITU's Recommendation H.324 include all the elements in component 470, except that only one modem (such as modem 464) is used. Also, the current Recommendation H.223 does not include the capability of accepting more than one modem device. The videophone system 450 of the present invention can combine the bandwidth of one, two, . . . or all the modems in component 470 using the above described methods.

Videophone system 450 also includes a video I/O equipment 472 connected to video codec 452, an audio I/O equipment 474 connected to audio codec 454, and system control 476 connected to control protocol block 458 and modems 464–466. Videophone 450 may optionally be connected to user data applications 478.

Each modem in videophone 450 is connected to a telephone line of the PSTN network. For multipoint connections, a multipoint control unit (MCU) is also present (not shown in FIG. 14).

(H) Application to Modem Systems

Figure 15:
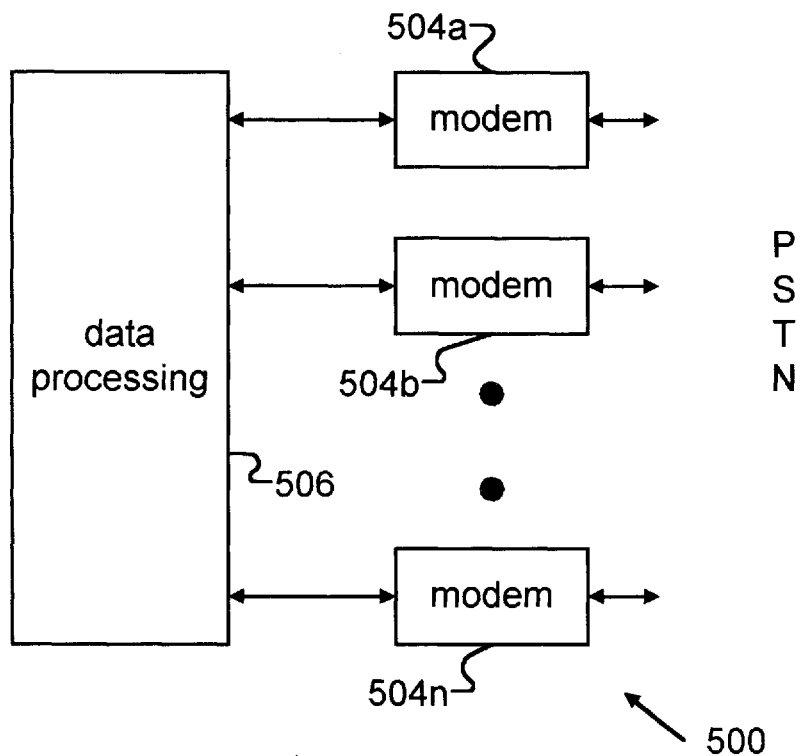
FIG. 15 is a block diagram showing a plurality of modems connected in accordance with the present invention.

The present invention can also be applied to a data processing system 500 containing more than one modems. As can be seen in FIG. 15, a plurality of modems, such as modems 504a, 504b, . . . 504n, are connected to a data processing unit 506. Each modem is connected to the PSTN via a telephone line. Unit 506 could be a piece of software, a chip, a board, or a computer containing CPU, memory and peripheral devices. Modems 504a, 504b, . . . 504n could be separate modems or a single chip device that can enhance the bandwidth in accordance with the present invention. Alternatively, all the modems and data processing unit 506 could be fabricated on a single chip.

System 500 incorporates hardware and software that can incorporate the connection and identification methods of the present invention. As a result, the bandwidth of the system can be enhanced at will.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for connecting a local and a remote device using a plurality of telephone lines, said local device containing at least a first and a second line system connected to a first and a second telephone line associated with a first and a second telephone number, respectively, said remote device containing at least a first and a second line system connected to a third and a fourth telephone line associated with a third and a fourth telephone number, respectively, said method comprising the steps of:

dialing, by said first line system of said remote device, said first telephone number to initiate a first call to said first telephone line;

receiving said first call on said first telephone line by said first line system of said local device, thereby establishing a first telephone connection;

sending said second telephone number by said local device to said remote device on said first telephone connection;

dialing, by said second line system of said remote device, said second telephone number to initiate a second call to said second telephone line;

identifying, by said local device and prior to establishing a second telephone connection, said second call as originated from said remote device;

receiving said second call on said second telephone line by said second line system of said local device, thereby establishing said second telephone connection;

said remote device dividing a data stream and transmitting divided data to said local device using both of said first and said second telephone connections; and said local device receiving and combining said divided data to recover said data stream.

2. The method of claim 1 further comprising the step of obtaining said second telephone number by said first line system of said local device prior to said remote device dialing said first telephone number.

3. The method of claim 2 wherein said first and said second line systems of said local device are connected by an electrical link, and wherein said step of obtaining comprises the step of sending said second telephone number by said second line system of said local device to said first line system of said local device via said electrical link.

4. The method of claim 1 wherein said identifying step comprises the steps of:

receiving, by said second line system of said remote device, a ringback signal;

sending an acknowledgment signal to said local device by said remote device indicating the receipt of said ringback signal;

receiving, by said second line system of said local device, a ring signal; and identifying said second call as originated from said remote device when said acknowledgment signal and said ring signal are received by said local device.

5. The method of claim 1 wherein said identifying step comprises the steps of:

receiving, by said second line system of said remote device, a ringback signal;

sending an acknowledgment signal to said local device by said remote device indicating the receipt of said ringback signal;

receiving, by said second line system of said local device, a ring signal; and identifying said second call as originated from said remote device when said acknowledgment signal and said ring signal are received by said local device within a predetermined time interval.

6. The method of claim 1 wherein said data stream comprises video data.

7. The method of claim 1 wherein each of said line systems comprises a modem.

8. A method for connecting a local and a remote device using a plurality of telephone lines, said local device containing at least a first and a second line system connected to a first and a second telephone line associated with a first and a second telephone number, respectively, said remote device containing at least a first and a second line system connected to a third and a fourth telephone line associated with a third and a fourth telephone number, respectively, said method comprising the steps of:

dialing, by said first line system of said remote device, said first telephone number to initiate a first call to said first telephone line;

receiving said first call on said first telephone line by said first line system of said local device, thereby establishing a first telephone connection;

sending said second telephone number by said local device to said remote device on said first telephone connection;

dialing, by said second line system of said remote device, said second telephone number to initiate a second call to said second telephone line;

receiving said second call on said second telephone line by said second line system of said local device, thereby establishing a second telephone connection;

said remote device dividing a data stream and transmitting divided data to said local device using both of said first and said second telephone connections;

said local device receiving and combining said divided data to recover said data stream; and identifying, by said local device, said second call as originated from said remote device, said identifying step comprising the steps of:

sending said fourth telephone number to said local device; and detecting, by said second line system of said local device, a caller-ID number that corresponds to said fourth telephone number.

9. A method for connecting a local and a remote device using a plurality of telephone lines, said local device containing at least a first and a second line system connected to a first and a second telephone line associated with a first and a second telephone number, respectively, said remote device containing at least a first and a second line system connected to a third and a fourth telephone line associated with a third and a fourth telephone number, respectively, said method comprising the steps of:

dialing, by said first line system of said remote device, said first telephone number to initiate a first call to said first telephone line;

receiving said first call on said first telephone line by said first line system of said local device, thereby establishing a first telephone connection;

sending said second telephone number by said local device to said remote device on said first telephone connection;

dialing, by said second line system of said remote device, said second telephone number to initiate a second call to said second telephone line;

receiving said second call on said second telephone line by said second line system of said local device, thereby establishing a second telephone connection;

said remote device dividing a data stream and transmitting divided data to said local device using both of said first and said second telephone connections;

said local device receiving and combining said divided data to recover said data stream;

identifying, by said local device, said second call as originated from said remote device, said identifying step comprising the steps of:

receiving, by said second line system of said remote device, a ringback signal;

sending an acknowledgment signal to said local device by said remote device indicating the receipt of said ringback signal;

receiving, by said second line system of said local device, a ring signal; and identifying said second call as originated from said remote device when said acknowledgment signal and said ring signal are received by said local device; and wherein said acknowledgment signal further includes a signal identifying said second line system of said remote device.

10. A method for connecting a local videophone and a remote videophone using a plurality of telephone lines, each of said videophones containing a video codec and an audio codec, said local videophone containing at least a first and a second modem connected to a first and a second telephone line associated with a first and a second telephone number, said remote videophone containing at least a first and a second modem connected to a third and a fourth telephone line associated with a third and a fourth telephone number, said method comprising the steps of:

dialing, by said remote videophone, said first telephone number to initiate a first call to said first telephone line;

receiving said first call on said first telephone line by said local videophone, thereby establishing a first telephone connection;

sending said second telephone number by said first modem of said local videophone to said first modem of said remote videophone on said first telephone connection;

dialing, by said remote videophone, said second telephone number to initiate a second call to said second telephone line;

identifying, by said local videophone and prior to establishing a second telephone connection, said second call as originated from said remote videophone;

receiving said second call on said second telephone line by said local videophone, thereby establishing said second telephone connection;

said remote videophone dividing a video data stream and transmitting, using both said first and said second modems of said remote videophone, divided data to said local videophone; and said local videophone receiving said divided data using said first and said second modems of said local videophone and combining said received data to recover said data stream.

11. The method of claim 10 further comprising the steps of:

receiving, by said remote videophone, a ringback signal associated with dialing said second telephone number;

sending an acknowledgment signal to said local videophone by said remote videophone indicating the receipt of said ringback signal;

receiving, by said local videophone, a ring signal; and identifying said second call as originated from said remote videophone when said acknowledgment signal and said ring signal are received by said local videophone.

12. The method of claim 10 wherein said identifying step further comprising the steps of:

sending said fourth telephone number to said local device; and detecting, by said second line system of said local device, a caller-ID number that corresponds to said fourth telephone number.

13. The method of claim 10 wherein said identifying step further comprising the steps of:

receiving, by said remote videophone, a ringback signal associated with dialing said second telephone number;

sending an acknowledgment signal to said local videophone by said remote videophone indicating the receipt of said ringback signal;

receiving, by said local videophone, a ring signal; and classifying said second call as originated from said remote videophone when said acknowledgment signal and said ring signal are received by said local videophone within a predetermined time interval.

* * * * *